(12) United States Patent
Mather et al.

(10) Patent No.: US 7,671,935 B2
(45) Date of Patent: Mar. 2, 2010

(54) DISPLAY

(75) Inventors: Jonathan Mather, Greater Leys (GB); Etienne Lesage, Franconville (FR); David James Montgomery, Bampton (GB)

(73) Assignee: Sharp Kabushiki Kaisha, Osaka (JP)

( * ) Notice: Subject to any disclaimer, the term of this patent is extended or adjusted under 35 U.S.C. 154(b) by 881 days.

(21) Appl. No.: 11/383,813

(22) Filed: May 17, 2006

(65) Prior Publication Data

US 2006/0262376 A1 Nov. 23, 2006

(30) Foreign Application Priority Data

May 19, 2005 (GB) ................................. 0510192.8

(51) Int. Cl.
*G02F 1/1335* (2006.01)

(52) U.S. Cl. ........................... 349/65; 349/62; 362/606; 362/615; 362/617

(58) Field of Classification Search .................. 349/65, 349/61, 62, 57, 95, 69, 15, 71, 70; 362/606, 362/615, 617; 359/248
See application file for complete search history.

(56) References Cited

U.S. PATENT DOCUMENTS

| 5,854,706 A | 12/1998 | Alb |
| 6,040,807 A | 3/2000 | Hamagishi et al. |
| 6,210,012 B1 * | 4/2001 | Broer ........................... 362/84 |
| 7,477,220 B2 * | 1/2009 | Muto ........................... 345/87 |
| 2004/0263451 A1 | 12/2004 | Muto | |

FOREIGN PATENT DOCUMENTS

| GB | 2 405 542 | 3/2005 |
| GB | 2 406 731 | 4/2005 |
| JP | 08-110495 | 4/1996 |
| WO | 2005/031412 | 4/2005 |
| WO | 2005/045488 | 5/2005 |

OTHER PUBLICATIONS

T. Okumura et al.; "Highly-Efficient Backlight for Liquid Crystal Display Having No Optical Films"; Applied Physical Letters; vol. 83, No. 13; pp. 2515-2517; Sep. 29, 2003.

* cited by examiner

*Primary Examiner*—Thoi V Duong
(74) *Attorney, Agent, or Firm*—Renner, Otto, Boisselle & Sklar, LLP

(57) ABSTRACT

A display comprises: a transmissive pixellated spatial light modulator (21); and a backlight (22). The backlight has a light-transmissive waveguide (26), with a first face of the waveguide being opposed to the spatial light modulator (21). The first face of the waveguide comprises a plurality of regions that are not totally internally reflective for at least one polarisation of light propagating within the waveguide, and the remainder of the first face of the waveguide is totally internally reflective for light propagating within the waveguide. Light is extracted from the waveguide at the regions where first face of the waveguide is not totally internally reflective. The pitch of the regions where first face of the waveguide is not totally internally reflective is substantially an integer multiple of the pitch of the pixels of the spatial light modulator.

55 Claims, 33 Drawing Sheets

Simulation

Simulation

Light is extracted behind a small transmissive aperture

Light is efficiently recycled behind the reflective pixel part.

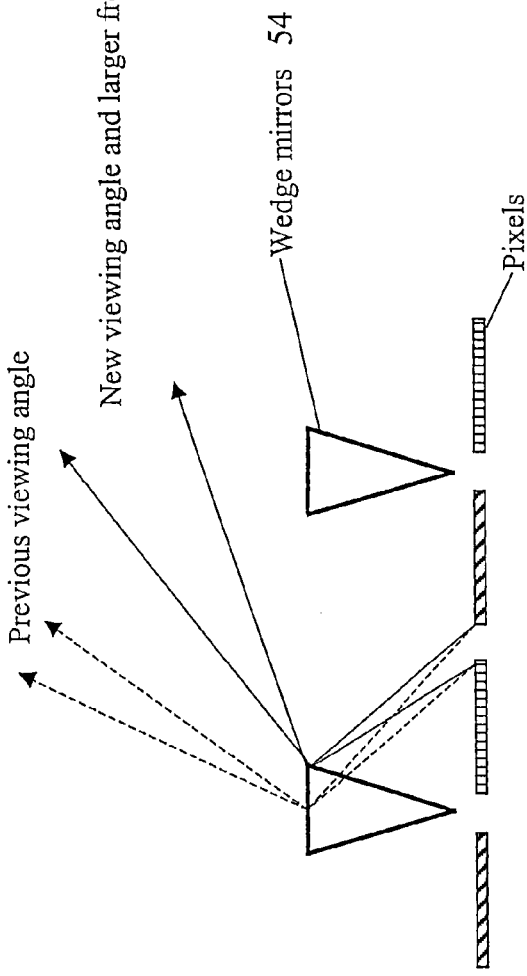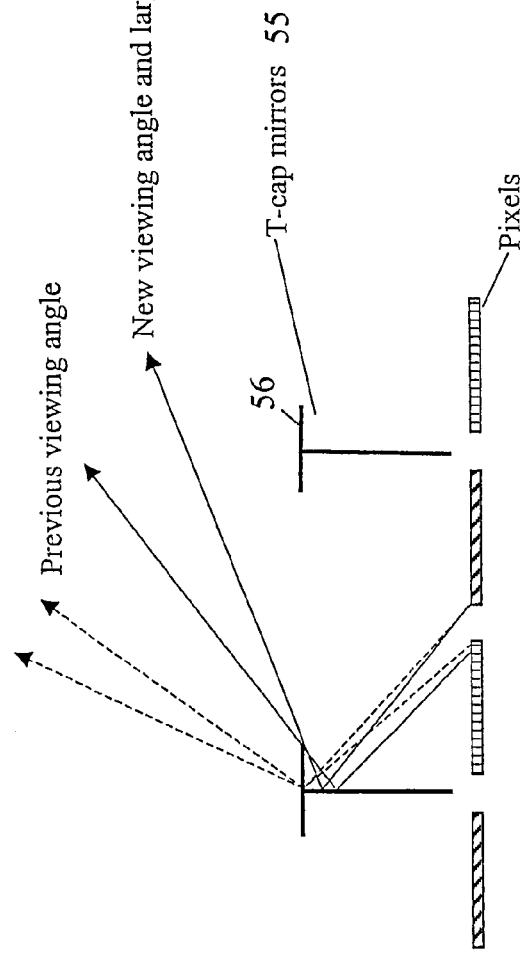
Figure 21A
Figure 21B

Mirrors
Pixels

View angle 22°

View angle 34°

View angle 48°

View angle 56°

DISPLAY

This Nonprovisional application claims priority under 35 U.S.C. § 119(a) on UK Patent Application No. 0510192.8 filed in the United Kingdom on May 19, 2005, the entire contents of which are hereby incorporated by reference.

FIELD OF THE INVENTION

The present invention relates to a display, in particular to a display in which light from the display is directed preferentially into two or more angular ranges. The display of the invention may display a conventional two-dimensional image, or it may be a multiple-view directional display which displays two or more images such that each image is visible from a different direction (for example so that two observers who view the display from different directions will see different images to one another).

BACKGROUND OF THE INVENTION

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data while a passenger may wish to view a film. These conflicting needs could be satisfied by providing two separate display devices, but this would take up extra space and would increase the cost. Furthermore, if two separate displays were used in this example it would be possible for the driver to see the passenger's display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space and is costly, and is not practical for portable games.

To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays. FIG. 1 illustrates a dual view display 1 installed in a motor vehicle. The display is displaying one image (GPS satellite navigation data) to the driver and at the same time is displaying a second image (a film) to a front seat passenger. The driver cannot see the film displayed to the passenger, and the passenger cannot see the satellite navigation data displayed to the driver.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games.

A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

In a multiple view directional display, the formation of the viewing windows is typically due to a combination of the picture element (or "pixel") structure of the image display unit of the display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce a multiple view directional display.

FIG. 2 is a plan view of a conventional multiple view directional device, in this case a dual view display, described in UK patent application GB 2 405 542. The directional display 1 consists of a spatial light modulator (SLM) 2 that constitutes an image display device, and a parallax barrier 3. The SLM 2 of FIG. 2 is in the form of a liquid crystal display (LCD) device having an active matrix thin film transistor (TFT) substrate 4, a counter-substrate 6, and a liquid crystal layer 5 disposed between the substrate 4 and the counter substrate 6. The SLM is provided with addressing electrodes (not shown) which define a plurality of independently-addressable picture elements (or pixels), and is also provided with alignment layers (not shown) for aligning the liquid crystal layer. The pixels of the SLM 4 are arranged in rows and columns with the columns extending into the plane of the paper in FIG. 2. Other components such as viewing angle enhancement films and linear polarisers may be provided, and these have been omitted from FIG. 2 for clarity. Illumination is supplied from a backlight (not shown), which provides substantially uniform illumination over the area of the SLM 4.

The parallax barrier 3 comprises a substrate 7 with a parallax barrier aperture array formed on its surface adjacent the SLM 2. The aperture array comprises vertically extending (that is, extending into the plane of the paper in FIG. 1) transparent apertures 8 separated by opaque portions 9. The parallax barrier may comprise additional components, such as, for example, an anti-reflection (AR) coating on the output surface of the parallax barrier substrate 7 (which forms the output surface of the display 1).

In use, two images are displayed by the SLM, interlaced between alternate columns of pixels. The display 1 forms a left image and a right image, and these are directed to a left observer 10 and a right observer 10' respectively.

A parallax barrier is the most common type of parallax optic used in current dual view and autostereoscopic 3-D displays. However, use of a parallax barrier has a number of disadvantages. Firstly, as shown in FIG. 2, a parallax barrier comprises opaque portions (which are usually absorbing for visible light) alternating with transmissive portions, and the effect of the opaque portions is to reduce the overall brightness of the display. The viewing windows obtained by use of a parallax barrier are relatively small, so that an observer has relatively little freedom in where they position their head—and a small movement of the observer's head is likely to take the head outside the viewing window. A further disadvantage is that an observer who views the display along the axis perpendicular to the display face of the display is likely to see both displayed images.

Okumura, Tagaya and Koike describe, in "Highly efficient backlight for liquid crystal display having no optical films", Applied Physics Letters, Vol. 83, No. 13, p 2515, 2003, the current state of the art in backlight construction. They describe a backlight having a waveguide with an upper surface which is roughened so that light is emitted over the entire area of the upper surface of the waveguide. Light-directing films are provided between the waveguide of the backlight and an image display device, to direct light emitted from the waveguide substantially along the axis of the image display device.

JP-A-8 110 495 discloses a multiple view display having a parallax barrier made from reflective metal. Light that is blocked by the opaque regions of the parallax barrier is reflected back towards the backlight and is ultimately and is "recycled" (i.e., is reflected towards the display again) by the backlight. The efficiency of this technique is however expected to be low, because, every time light is reflected and recycled, the metal regions of the parallax barrier absorb a significant amount of light. Light is also absorbed in components of the backlight, such as diffusers.

FIG. 18 shows a prior art 3-D display, described in U.S. Pat. No. 5,854,706, which does not use a parallax barrier. First and second images 11,12 are displayed on an image display layer. A single half silvered mirror 16 is positioned at the centre of the image display layer, and extends perpendicularly away from the image display layer. A first linear polariser 13 is placed over the region of the image display layer displaying the first image 11, and a second linear polariser 14, having its transmission axis orthogonal to the transmission axis of the first polariser, is placed over the region of the image display layer displaying the second image 12. Louvres 15,19, inclined with respect to the image display layer, are positioned over the image display layer. An observer 18 wears polarising glasses 17 such that they see only one of the images in each eye and so perceive a 3-D image.

The display of FIG. 18 requires that the observer wears polarising glasses to obtain a 3-D effect.

SUMMARY OF THE INVENTION

A first aspect of the present invention provides a display comprising: a transmissive pixellated spatial light modulator; and a backlight; wherein the backlight has a light-transmissive waveguide, a first face of the waveguide being opposed to the spatial light modulator; wherein the first face of the waveguide comprises a plurality of regions that are not totally internally reflective for at least one polarisation of light propagating within the waveguide, the remainder of the first face of the waveguide being totally internally reflective for light propagating within the waveguide; and wherein the pitch of the regions is substantially an integer multiple of the pitch of the pixels of the spatial light modulator. The regions of the backlight where the first face of the waveguide is totally internally reflective appear dark, and the backlight does not provide uniform illumination over the area of the spatial light modulator (SLM). The variation in intensity, over the area of the backlight, allows directional display of two images without the need for a parallax barrier. A parallax barrier is therefore not needed in a display of the invention, and the problems arising from the presence of a parallax barrier such as low brightness and low observer head freedom are therefore alleviated.

The term "integer multiple" as used herein is intended to include the case where the pitch of the regions is substantially equal to the pitch of the pixels of the spatial light modulator:—that is, to include the case where the integer is equal to one.

As is known, it is preferable that the pitch of a parallax barrier in, for example, a dual view display is not exactly equal to the pitch of the pixel columns, in order to provide "viewpoint correction". When the present invention is applied to a multiple view directional display, such as a dual view display, it is therefore preferable that the pitch of the light extraction points is not exactly equal to twice the pitch of the pixel columns, so as to provide viewpoint correction.

A plurality of protrusions may be disposed on the first face of the waveguide of the backlight, each protrusion having a refractive index that is not lower than the refractive index of the waveguide whereby the protrusion is not totally internally reflective for light propagating within the waveguide.

Regions of the first face between neighbouring protrusions may be coated with a material having a refractive index that is lower than the refractive index of the waveguide.

The protrusions may have light-directing surfaces shaped so as to direct light transmitted out of the waveguide into first and second angular ranges, the first angular range not overlapping the second angular range.

The first angular range may be on an opposite side of the normal axis of the display to the second angular range.

A cross-section through a light-directing surface of a protrusion may have at least a portion that is linear.

A light-directing surface of a protrusion may have at least a portion that is planar. It may have at least a portion that is at an angle of between 35° to 55° to the first face of the waveguide.

Alternatively, a cross-section through a light-directing surface of a protrusion may have at least a portion that is concave.

Each protrusion may extend substantially over the entire height of the backlight.

Alternatively, each protrusion may have the form of a solid of revolution about an axis perpendicular to the front face of the waveguide. Each protrusion may be conical or frusto-conical.

The refractive index of the protrusions may be equal to the refractive index of the waveguide of the backlight, or it may be greater than the refractive index of the waveguide of the backlight.

An input aperture of a protrusion may be dependent upon the distance of the protrusion from a side edge of the waveguide.

The shape of the light-directing surfaces of a protrusion may be dependent upon the distance of the protrusion from a side edge of the waveguide. This can compensate for the decrease in intensity of light propagating in the waveguide with an increase in distance from a light source.

A photo-luminescent material and a wavelength-dependent filter may be disposed between selected ones of the protrusions and the first face of the waveguide, the filter being between the photo-luminescent material and the first face of the waveguide, the photoluminescent material emitting visible light when illuminated by light of a predetermined wavelength outside the visible spectrum, and the wavelength-dependent filter being transmissive for light of the predetermined wavelength and non-transmissive for visible light.

The photo-luminescent material and wavelength-dependent filter may be disposed between every alternate protrusion and the first face of the waveguide.

The wavelength-dependent filter may be reflective for visible light.

The predetermined wavelength may be within the ultra-violet region of the spectrum.

The backlight may comprise a first light source for emitting light in the visible range of the spectrum and a second light source, controllable independently from the first light source, for emitting light of the predetermined wavelength.

The regions of the first face of the waveguide of the backlight that are not totally internally reflective may be provided with a scattering structure for scattering light out of the waveguide.

The regions of the first face of the waveguide that are totally internally reflective may be overlaid with a material having a refractive index lower than the refractive index of the waveguide.

The regions of the first face of the waveguide that are totally internally reflective may be overlaid with a material that is not transmissive to visible light. Additionally or alternatively, they may be overlaid with a material that is reflective to visible light.

A photo-luminescent material and a wavelength-dependent filter may be disposed over selected ones of the regions of the first face of the waveguide of the backlight that are not totally internally reflective, the filter being between the photo-luminescent material and the first face of the waveguide, the photoluminescent material emitting visible light when illuminated by light of a predetermined wavelength outside the visible spectrum, and the wavelength-dependent filter being transmissive for light of the predetermined wavelength and non-transmissive for visible light.

The photo-luminescent material and wavelength-dependent filter may be disposed over every alternate region of the first face of the waveguide of the backlight that is not totally internally reflective.

The wavelength-dependent filter may be reflective for visible light.

The predetermined wavelength may be within the ultra-violet region of the spectrum.

The backlight may comprise a first light source for emitting light in the visible range of the spectrum and a second light source, controllable independently from the first light source, for emitting light of the predetermined wavelength.

The display may comprise a structure overlying the waveguide of the backlight, selected regions of the structure having birefringent properties whereby the interface between the waveguide and the selected regions of the structure is not totally internally reflective for at least one polarisation of light propagating within the waveguide.

A plurality of birefringent protrusions may be disposed on the first face of the waveguide of the backlight, each protrusion having a refractive index that, for light of a first polarisation, is not lower than the refractive index of the waveguide whereby the protrusion is not totally internally reflective for light of the first polarisation propagating within the waveguide.

Each protrusion may have a refractive index, for light of a second polarisation different from the first polarisation, that is lower than the refractive index, for the second polarisation, of the waveguide whereby the protrusion is totally internally reflective for light of the second polarisation propagating within the waveguide.

Regions of the first face between neighbouring protrusions may be coated with a material having a refractive index, for light of a first polarisation, that is lower than the refractive index, for light of a first polarisation, of the waveguide.

The protrusions may have light-directing surfaces shaped so as to direct light of the first polarisation transmitted out of the waveguide into first and second angular ranges, the first angular range not overlapping the second angular range.

The first angular range may be on an opposite side of the normal axis of the display to the second angular range.

A cross-section through a light-directing surface of a protrusion may have at least a portion that is linear.

A light-directing surface of a protrusion may have at least a portion that is planar.

A light-directing surface of a protrusion may have at least a portion that is at an angle of between 35° to 55° to the first face of the waveguide.

A cross-section through a light-directing surface of a protrusion may have at least a portion that is concave.

Each protrusion may extend substantially over the entire height of the backlight.

Each protrusion may have the form of a solid of revolution about an axis perpendicular to the front face of the waveguide. It may be conical or frusto-conical.

The refractive index of the protrusions, for light of the first polarisation, may be equal to the refractive index of the waveguide of the backlight for light of the first polarisation, or it may be greater than the refractive index of the waveguide of the backlight for light of the first polarisation.

An input aperture of a protrusion may be dependent upon the distance of the protrusion from a side edge of the waveguide.

The light guide may be birefringent.

The display may comprise: a light source disposed adjacent to one side edge of the waveguide of the backlight; and a reflective polarisation converter for converting light of the second polarisation to the first polarisation disposed adjacent to an opposite side edge of the waveguide.

A second aspect of the present invention provides a backlight comprising: a waveguide; and a structure overlying the waveguide, selected regions of the structure having birefringent properties whereby the interface between the waveguide and the selected regions of the structure is not totally internally reflective for one polarisation of light propagating within the waveguide.

A backlight of this aspect of the invention emits light of substantially one polarisation state, provided that the overlying structure is arranged to be totally internally reflective for light of an orthogonal polarisation state. When the backlight is used to illuminate a an image display device that requires polarised light, such as a liquid crystal display, it is therefore not necessary to provide the image display device with an input polariser.

A third aspect of the invention provides a display comprising: a transmissive image display layer; and a backlight of the second aspect.

The image display layer may be a pixellated image display layer; and a plurality of regions where the interface between the structure and the waveguide is not totally internally reflective for at the least one polarisation of light may be provided behind each pixel aperture of the image display layer. This provides uniform, high intensity illumination of each pixel.

The structure may be provided between the image display layer and the waveguide. The surface where light is extracted from the waveguide is then disposed close to the image display layer, allowing good registration between the light extraction points and the image display layer.

A fourth aspect of the present invention provides a display comprising a pixellated spatial light modulator; and a plurality of reflective louvres, each louvre extending away from, and being perpendicular or substantially perpendicular to, the front face of the light modulator; wherein the pitch of the louvres is approximately 2np, where n is an integer and p is the pixel pitch of the light modulator.

A display according to this aspect can again provide a directional display without the need for a parallax barrier to be provided, since the reflective louvres direct light from the SLM into two viewing windows. Problems arising from the presence of a parallax barrier, such as low brightness and low observer head freedom, are again alleviated.

The louvres may be planar.

The cross-section of a louvre may vary over the height of the louvre.

The cross-section of a louvre may be dependent on the position of the louvre on the display.

The louvres may be T-shaped in cross-section.

The lateral thickness of the louvres may increases with distance from the front face of the light modulator.

A first end of each louvre may be spaced from the plane of the pixels of the light modulator.

The display as claimed in any preceding claim may comprise a multiple view directional display. It may comprise a dual view display.

BRIEF DESCRIPTION OF THE DRAWINGS

Preferred embodiments of the present invention will be described by way of illustrative example with reference to the accompanying figures in which:

FIGS. 21A and 21B are schematic sectional plan views of modified embodiments of the display of FIG. 19A;

DESCRIPTION OF THE EMBODIMENTS

Figure 3:
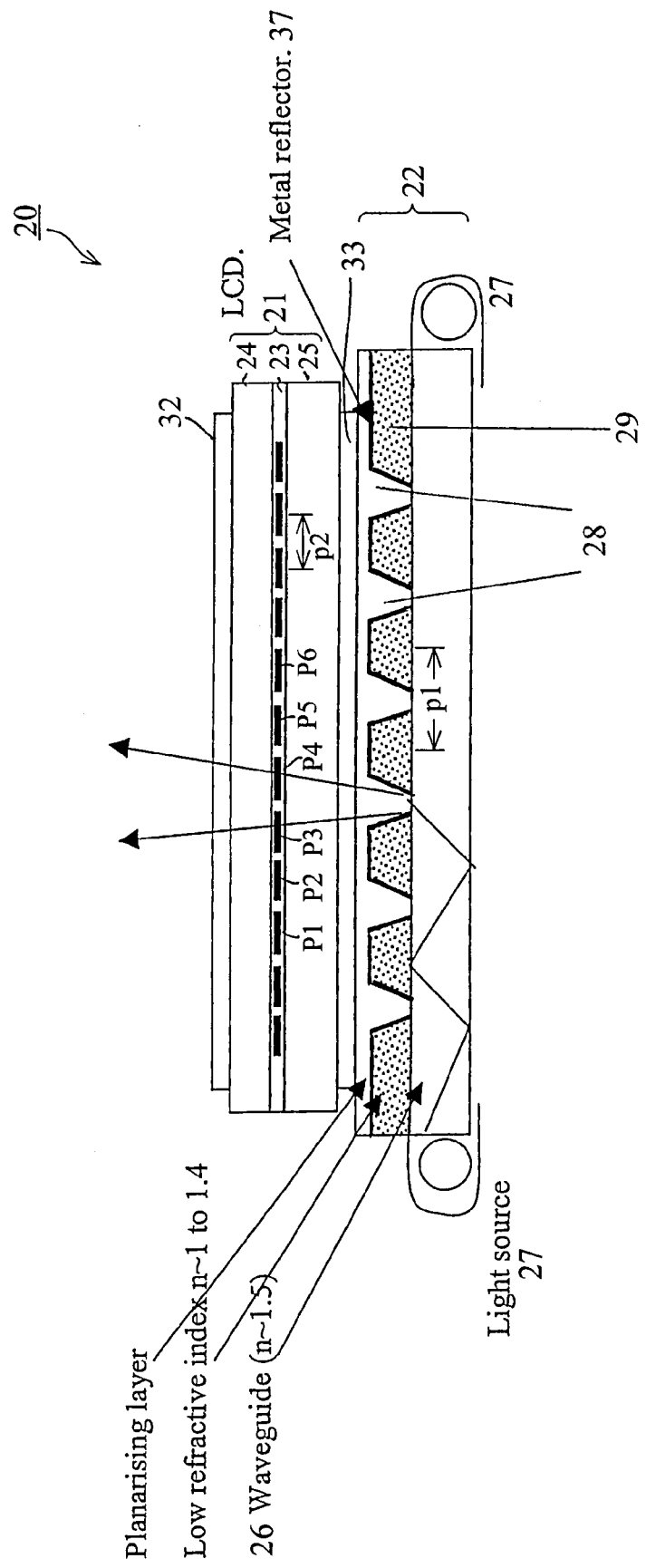
FIG. 3 is a schematic plan sectional view of a display according to a first embodiment of the present invention.

FIG. 3 is a schematic sectional plan view of a display 20 according to an embodiment of the present invention. The display comprises a transmissive pixellated spatial light modulator 21 illuminated by a backlight 22. The spatial light modulator 21 is, in this embodiment, a transmissive liquid crystal display device comprising a layer of liquid crystal material 23 disposed between first and second transparent substrates 24, 25. An array of pixel electrodes is provided on one of the substrates 24,25 to enable individual pixels of the liquid crystal layer to be addressed independently from one another. The substrates 24,25 and liquid crystal layer 23 are disposed between a first polariser 32 and a second polariser 33.

The spatial light modulator 21 may be conventional in constructions, and its detailed structure will not be described here. In principle, the spatial light modulator is not limited to a liquid crystal spatial light modulator.

The backlight 22 comprises a waveguide 26 that is illuminated by one or more light sources 27. In FIG. 3 two light sources are shown, arranged against opposite side edge faces of the waveguide 26, but the backlight may have only one light source or may have more than two light sources. Preferably, the or each light source extends along substantially the entire length of the respective side edge face of the waveguide 26, and may be, for example, a fluorescent tube.

The light from the or each light source 27 enters the waveguide 26 of the backlight. The surface of the waveguide that faces the spatial light modulator 21—which face will be referred to as the "exit face" of the waveguide—has regions ("TIR regions") that are totally internally reflecting for light propagating within the waveguide, and has regions ("non-TIR regions") that are not totally internally reflective for light propagating within the waveguide. When light propagating within the waveguide is incident on a region of the exit face which is not totally internally reflecting, light is refracted out of the waveguide towards the SLM 21.

Any light emitted from the rear face of the waveguide 26 would be emitted away from the SLM and would therefore be wasted. The rear face of the waveguide 26 is therefore preferably totally internally reflecting for light propagating within the waveguide.

The regions of the exit face of the waveguide that are not totally internally reflecting are arranged to have a pitch p1 which is equal to the pitch p2 of the pixels of the SLM or which is an integer multiple of the pitch p2 of the pixels of the SLM. That is, p1=n p2 where n=1, 2, 3. . . . Where this embodiment is applied to a dual view display, the pitch p1 of the non-TIR regions of the exit face of the waveguide is preferably twice the pixel pitch p2, so that one non-TIR region is provided for every pair of a "left pixel" column and a "right pixel" column, where a "left (right) pixel" column is a column of pixels that displays the image intended for display to the left (right) observer. (In principle however, one non-TIR region could be provided for, for example, every set of m left pixel columns and m right pixel columns, where m>1.) The centre of a non-TIR region is preferably laterally aligned with the non-display portion between a left pixel column and a right pixel column. Where this embodiment is applied to a conventional 2-D display, however, the pitch p1 of the non-TIR regions of the exit face of the waveguide is preferably equal to the pixel pitch p2, so that one non-TIR region is provided for every pixel column.

In the embodiment of FIG. 3, the regions of the exit face of the waveguide that are not totally internally reflecting (these regions will be referred to as "non-TIR regions") are obtained by disposing a plurality of protrusions 28 over the exit face of the waveguide 26. Each protrusion 28 has a refractive index that is not lower than the refractive index of the waveguide 26, so that total internal reflection does not occur at the boundary between the waveguide 26 and the protrusion 28. The refractive index of the protrusions 28 may be the same as the refractive index of the waveguide, or it may be greater than the refractive index of the waveguide 26.

Figure 7A:
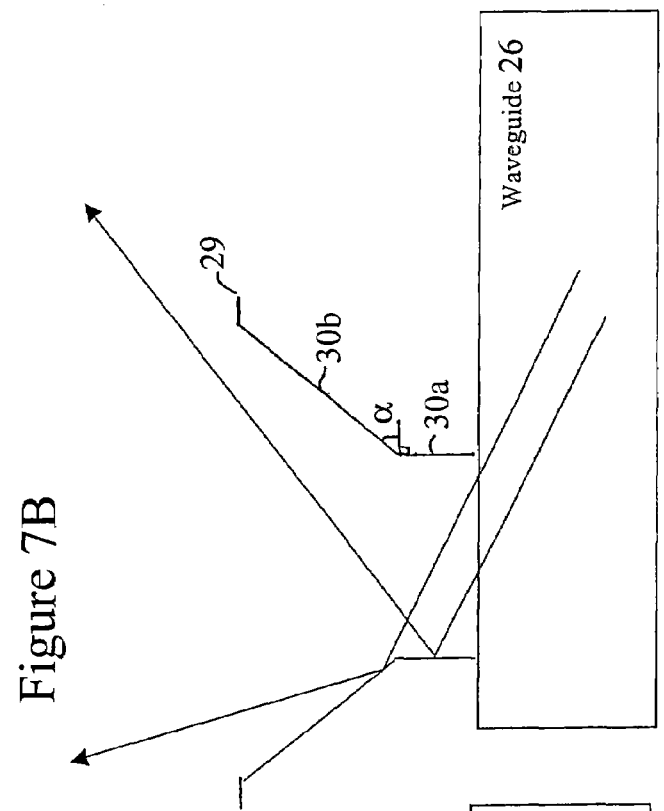
FIGS. 7A, 7B, 7C, 7D and 7E illustrate further embodiments of the display of FIG. 3.

As is shown in FIG. 7A, the protrusions 28 have light-directing surfaces 30 that direct light emitted from the waveguide at the interface between the waveguide and the protrusion 28. The light directing surfaces direct light transmitted out of the waveguide into first and second, non-overlapping angular ranges.

The present invention therefore allows a multiple view directional display to be obtained without the need to provide a parallax barrier. As can be seen, the effect of the protrusions 28, and their light-directing surfaces, is that the pixels of the SLM are illuminated by light that is travelling in either the first angular range or the second angular range. Pixel columns P1, P3, P5, etc are illuminated by light travelling within the first angular range, and pixel columns P2, P4, P6, etc are illuminated by light travelling in the second angular range. If two images are displayed in interlaced fashion, with one image being displayed on pixel columns P1, P3, P5, etc. and the other image on pixel columns P2, P4, P6, etc., the first image will be visible for viewing directions within the first angular range, and the second image will be visible for viewing directions within the second angular range. A 3-D autostereoscopic display or a dual view display can therefore be obtained, by choosing the first and second angular ranges to define appropriate viewing windows.

The first and second angular ranges are preferably arranged on opposite sides of the normal to the display face of the display 20.

Regions of the exit face of the waveguide 26 between neighbouring protrusions 28 are preferably coated with a material 29 having a refractive index lower than the refractive index of the waveguide 26. This ensures that light is totally internally reflected while the protrusions 28 are not provided. As an example, if the waveguide 26 has a refractive index of approximately 1.5, regions where the protrusion 28 are not present are preferably coated with a material 29 having a refractive index that is below 1.4.

Since the display 20 does not require a parallax barrier in order to obtain a directional display mode, the brightness of the display is considerably greater than a prior art display having a parallax barrier. The process of extracting light from the waveguide 26 by total internal reflection is almost 100% efficient, so that substantially no light is absorbed by the waveguide. Virtually all light generated by the light source(s) 27 is directed through a pixel of the SLM, and very little light is absorbed in the waveguide or within the SLM. As a result, a display of the invention can be up to four times as bright as a display incorporating a conventional parallax barrier.

Figure 4:
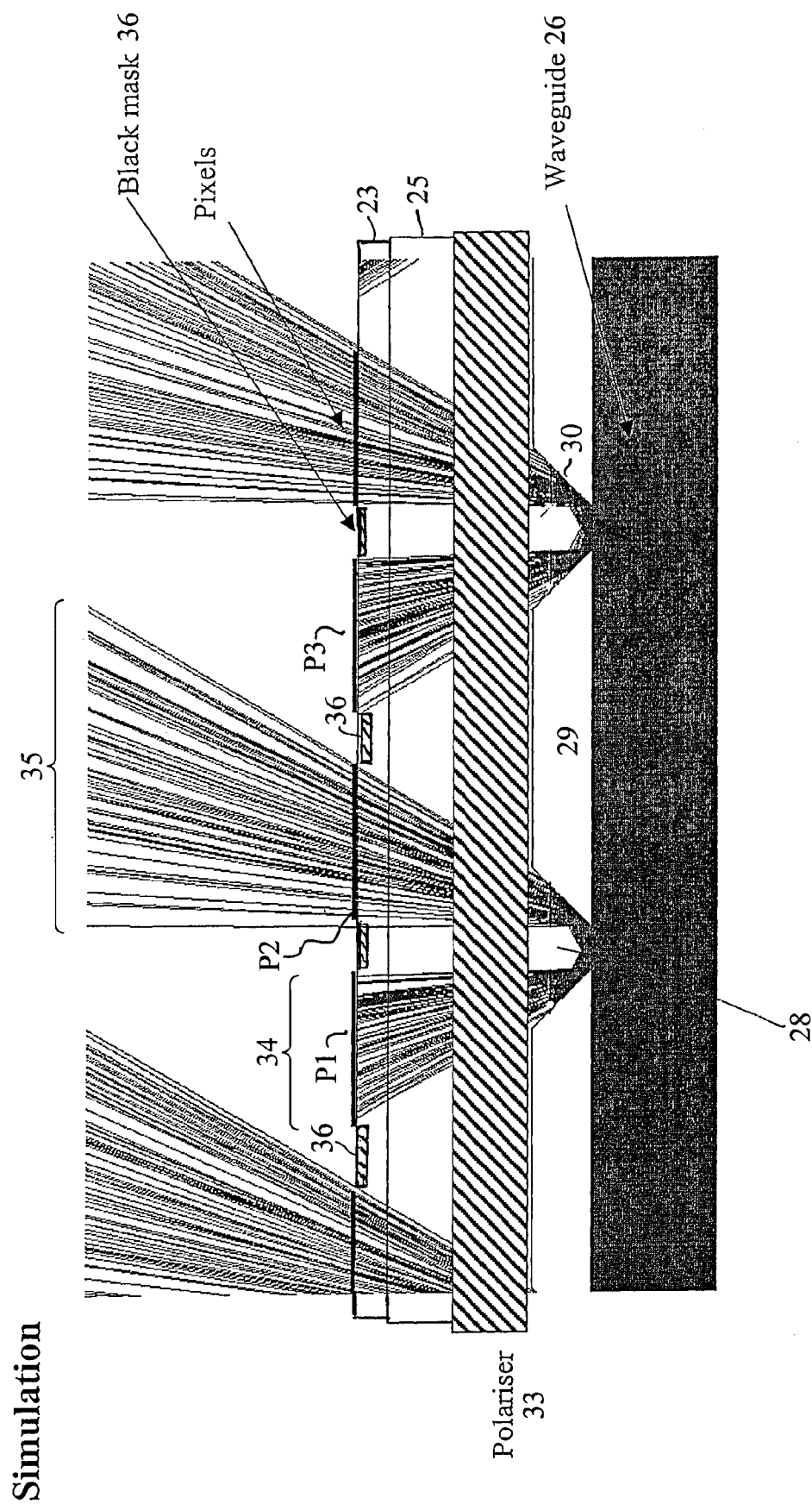
FIG. 4 illustrates operation of the display of FIG. 3.

FIG. 4 is a schematic illustration of the display 20 in operation. The upper substrate 24 of the SLM, and the exit polariser 32 have been omitted from FIG. 4 for clarity. The simulation is for a display in which the lower substrate 25 of the SLM is a glass substrate approximately 70 μm thick.

As can be seen, light is extracted from the waveguide 26 in the non-TIR regions formed at the interface between each protrusion 28 and the waveguide 26. The light-directing surfaces 30 of the protrusions direct light into a first angular range 34 and a second angular range 35. As explained above, pixel columns P1, P3 etc. are illuminated by light travelling within the first angular range, and pixel columns P2, P4, are illuminated by light travelling in the second angular range 35, so that a directional display can be obtained without the need for a parallax barrier.

In a conventional liquid crystal display, a black mask is provided between the pixels of the display. The black mask is shown in FIG. 4 as opaque regions 36 disposed between adjacent pixels. In a conventional dual view display, some light from the backlight will be incident on the black mask and so will be absorbed and is not available to contribute to the output of the display. In a preferred embodiment of the present invention, in contrast, the first and second angular ranges 34, 35 are chosen such that little or no light emitted from the backlight is incident on the black mask. It can be seen in FIG. 4 that virtually none of the emitted light is incident on the opaque regions 36 of the black mask.

A pixel is generally rectangular, and is normally arranged with its long dimension running vertically when the display is in its normal orientation. To obtain the largest possible viewing window, the pixels of a display of the invention may be arranged with their long dimension running horizontally when the display is in its normal orientation (i.e., as a "rotated pixel").

In a conventional SLM incorporating a liquid crystal layer, approximately 50% of light incident on the SLM is absorbed in the black mask. By directing light from the backlight into angular ranges that are not incident on the black mask, as shown in FIG. 4, the present invention obtains an increase in brightness of approximately a factor or 2.

A further advantage of the present invention is that, in a conventional dual view display, light from the backlight is emitted at all angles. The output of a conventional dual view display such as that shown in FIG. 2 will therefore include light travelling along the axis of the display, and light travelling at very high angles to the axis of the display—but this is outside the viewing windows formed by the display, and instead illuminates the central image mixing region or secondary viewing windows. In contrast, the display of the present invention emits substantially all light into the viewing windows formed by the display—in FIG. 4, for example, virtually all light emitted by the backlight is directed to either the first viewing window or the second viewing window. This provides an increase in brightness of approximately a factor of 2.

Figure 1:
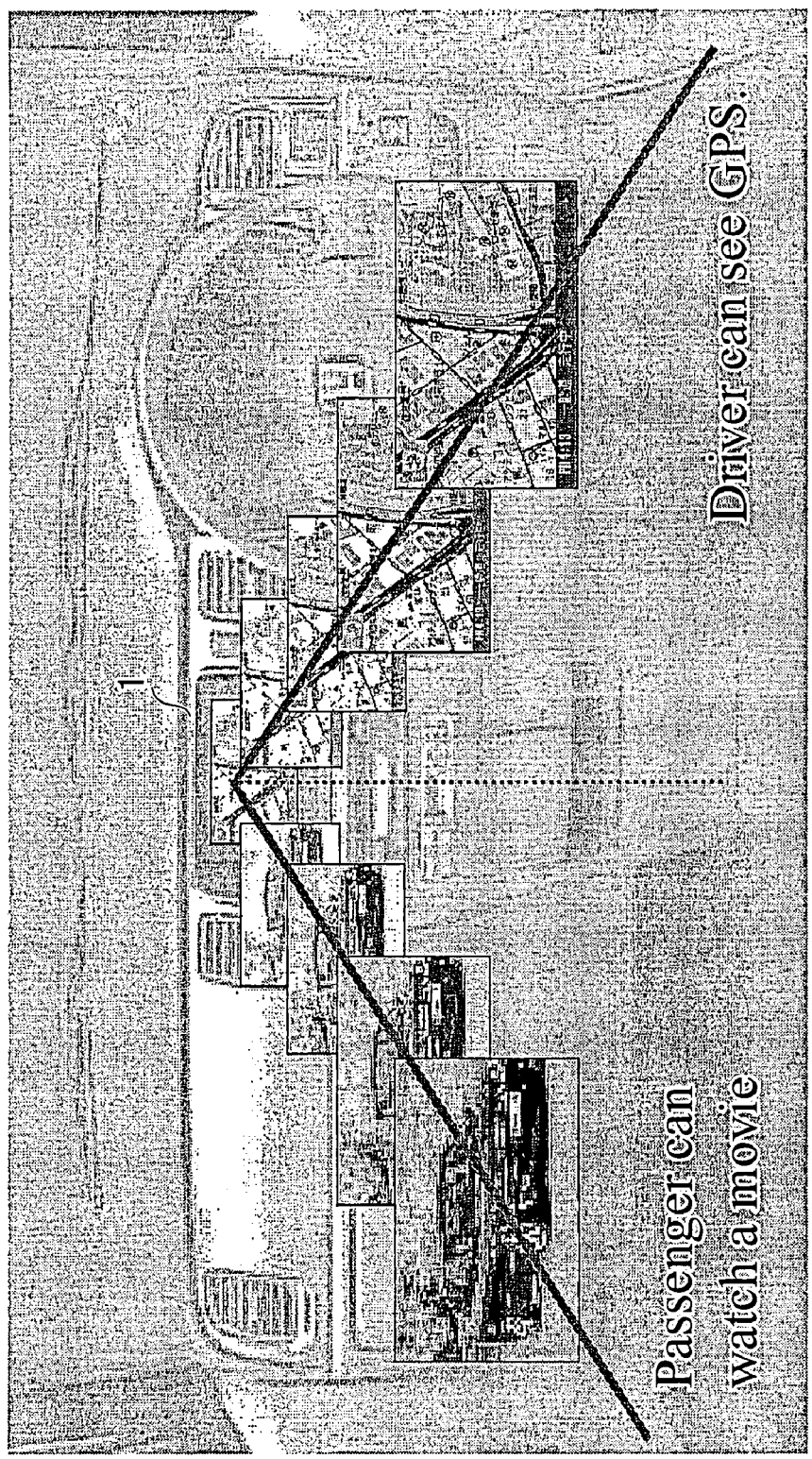
FIG. 1 shows a dual view display installed in a motor vehicle.

These two increases of a factor of 2 in brightness combine with the increase of a factor of 4 mentioned above to give a 16-fold increase in brightness obtainable by a display of the present invention The display of the present invention may have further advantages over a conventional display. Light directing in a conventional dual view display may be done by providing additional optical films, as described in FIG. 1(a) of the article by Okamura et al. (above), but these are not required in the present invention since the light is directed into the first and second angular ranges by the protrusions 28. This may reduce the cost of the display, and also reduce its thickness.

Figure 5:
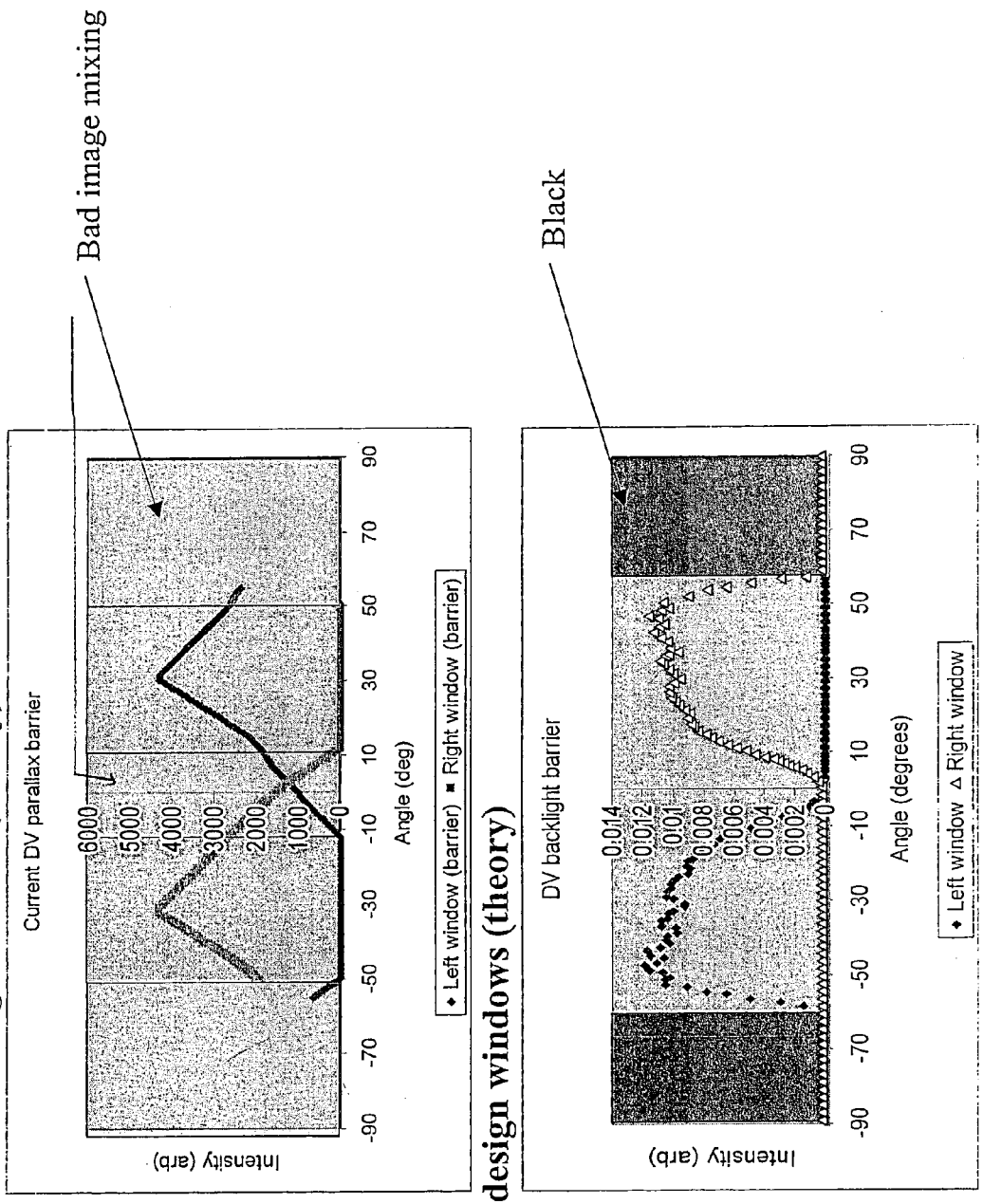
FIG. 5 illustrates the greater range of viewing angles provided by the display of FIG. 3.

A further advantage of a display of the present invention is that it can provide viewing windows having a greater angular extent than a conventional display. The upper view in FIG. 5 is a plot of intensity against viewing angle for a conventional dual view display incorporating a parallax barrier. The viewing windows are defined by the angular ranges in which only one image can be seen. It can be seen that the left and right viewing windows have an angular extent of approximately 35°—each viewing window extends from ±15° to ±50°. For viewing angles more than 50° away from the normal axis, or for viewing angles less than 15° from the normal axis, image mixing occurs as both images are visible in these angular ranges. An observer positioned at an angle of greater than 50°, between −15° and 15° or at a viewing angle below −50° will therefore see both images.

The lower view in FIG. 5 is a theoretical calculation of the intensity against viewing angle for a display according to FIG. 3, having protrusions 28 shaped as shown in FIG. 7A with $\alpha=45°$. It can be seen that the viewing windows have a considerably larger angular extent for the display of FIG. 3 than for a conventional dual view display. Each viewing window extends from an angle of approximately ±5° from the normal axis to approximately ±55° from the normal axis.

It will also be seen that an observer at a viewing angle of more than ±55° to the normal axis will simply see a black image, and will not perceive image mixing. This makes a display of the invention more comfortable and convenient to use.

Figure 7B:
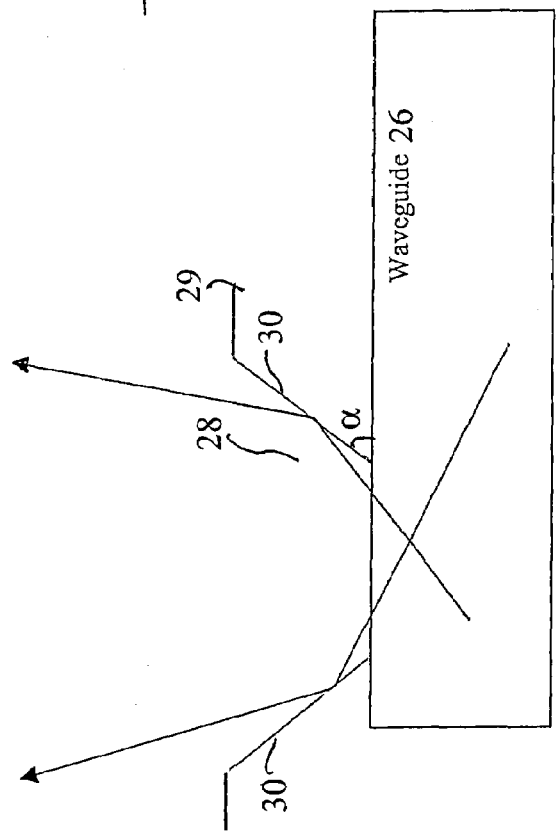
Figure 7C:
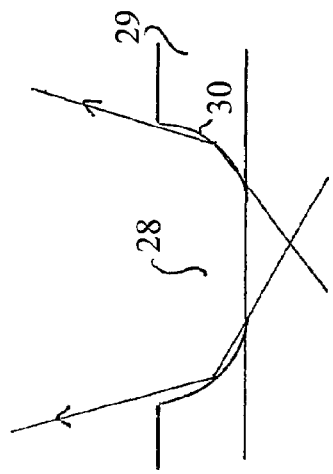
Figure 7D:
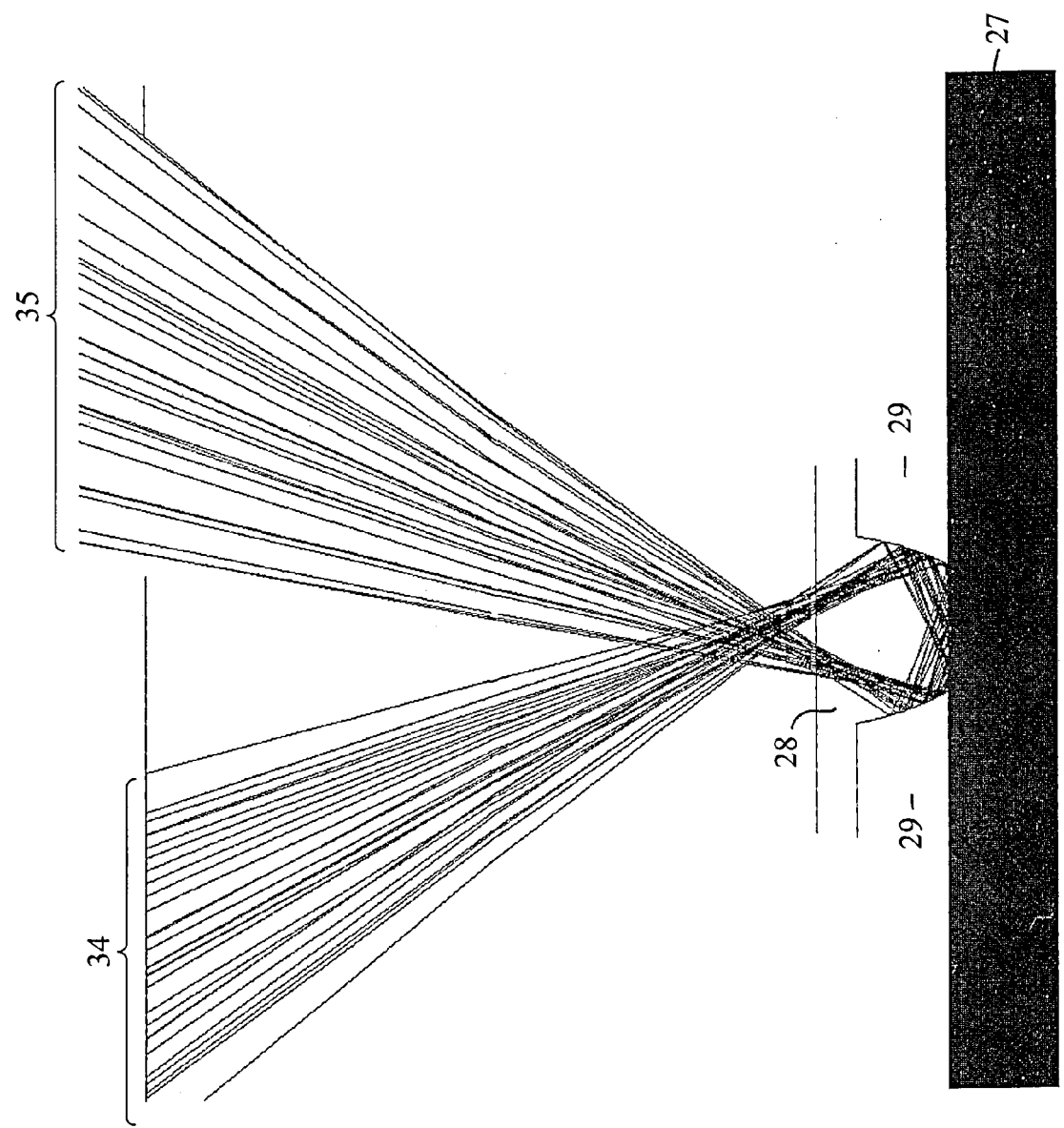

FIG. 3 shows the light-directing surfaces 30 of the protrusions 28 as being linear in cross-section. The entire light-directing surface is therefore angled at a suitable angle for directing light into the first and second angular ranges. Where the light-directing surfaces have a linear cross-section, one suitable value for the angle $\alpha$ between the light-directing surface and the exit face of the waveguide 26 is $35°<\alpha<55°$. It is, however, alternatively possible to have the reflectors arranged more steeply than this, for example $\alpha\approx70°$, so that the light directed into the first angular range intersects, and "crosses over with" light directed into the second angular range. This is illustrated in FIG. 7D.

It is not necessary for the entire surface of the protrusions 28 to be angled so as to direct light into the first and second angular ranges. As an example, FIG. 7B shows a modified structure for the protrusions 28, in which the light-directing surfaces 30 comprise a first portion 30a that is substantially perpendicular to the front face of the waveguide 26 and a second portion 30b that is angled so as to direct light into one of the first and second angular ranges. The angle $\alpha$ in FIG. 7B is preferably within the range of from 35° to 55°.

The light-directing surfaces of the protrusions 28 are not required to be linear in cross-section. As an alternative, the light-directing surfaces may have a concave curved cross-section as shown in FIG. 7C.

Figure 6A:
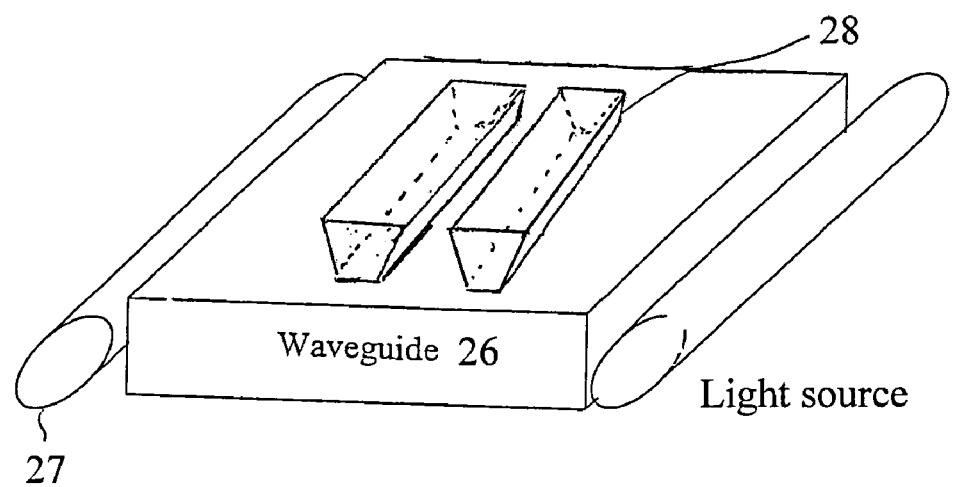
FIGS. 6A and 6B are schematic perspective views of embodiments of a backlight of the display of FIG. 3.

The protrusions 28 may be embodied as prisms, as shown in FIG. 6A. FIG. 6A shows prisms having planar surfaces, to provide the cross-section shown in FIG. 7A. However, the protrusion 28 of FIG. 7B or protrusions having a concave curved cross-section may also be embodied as prisms.

The backlight shown in FIG. 6A is oriented, in use, so that the light sources 7 are arranged along the lateral side edges of the waveguide 26, so that the light emissive, non-TIR, regions of the waveguide are oriented generally vertically. This provides image separation in the lateral (horizontal) direction. In this embodiment, the protrusions 28 extend over substantially the entire height of the backlight, when the display is in its normal orientation for viewing.

Figure 6B:
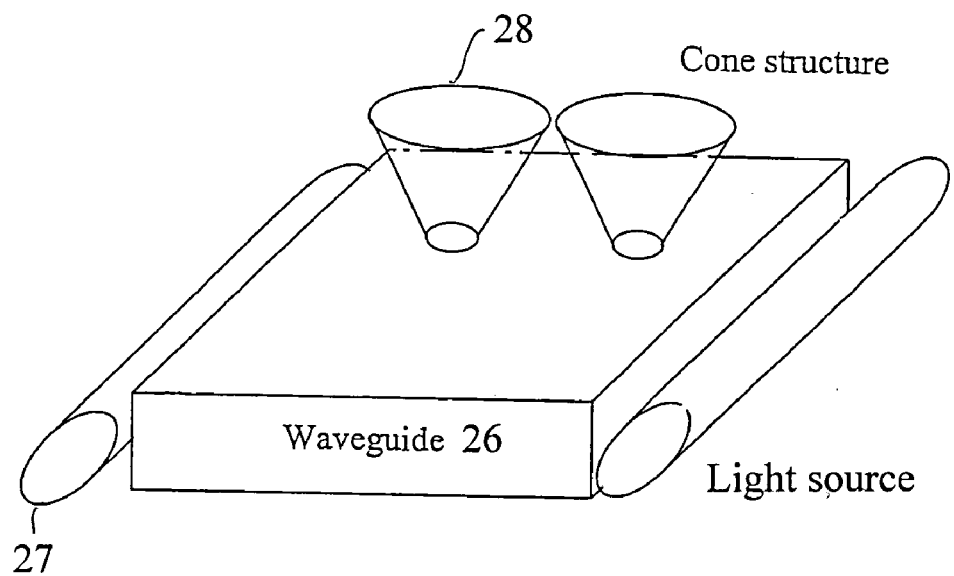

The protrusions 28 are not limited to being formed as prisms. For example, the protrusions 28 may have a "three-dimensional structure", in which they have a finite extent in both the height and width directions of the backlight. An example of such protrusions is shown in FIG. 6B. In FIG. 6B the protrusions are inverted conical or frusto-conical protrusions. The cross-section through the light-directing surface of the protrusions 28 is again planar, and a cross-section through the protrusions would appear as shown in FIG. 7A.

In more general terms, the protrusions may have the form of a solid of revolution about an axis perpendicular to the exit face of the waveguide 26. This would allow "three-dimensional" protrusions having a light-directing surface as shown in FIG. 7B, or having a curved, concave light-directing surface, to be obtained.

Providing the "three-dimensional" protrusions may be of use in a display that is intended to be rotatable about its normal axis, for example a display that can be rotated to display an image either in landscape format or in portrait format. The backlight of FIG. 6B can direct light into preferred angular ranges whether the light sources are arranged along the side edges of the waveguide or along the top and bottom edges of the waveguide. In contrast, the backlight of FIG. 6A cannot confine light in the direction parallel to the long axis of the prisms, since the end faces of the prisms do not provide any significant light-directing effect. The backlight of FIG. 6A is limited to use in a single orientation, since it is necessary that the prisms are aligned vertically when the display is in use, in order to provide lateral image separation.

If desired, a light-reflective layer 37 may be disposed over the low refractive index material 29. The reflective layer 37 may be, for example, a thin metallic layer. Providing the reflective layer 37 means, if any light should pass into the low refractive index material 29, for example as a result of surface roughness of the waveguide, it will be reflected by the reflective layer 37 and will not be transmitted through the SLM. In the case of a dual-view display, the reflective layer 37 is preferably also disposed over the inclined faces of the protrusions 28, as shown in FIG. 3, in order to minimise cross-talk.

Light that is extracted from the waveguide 26 will undergo, at most, one reflection by the reflective layer 37. In the case of a metallic reflector, this will result in an intensity loss of approximately 8% (caused by light being absorbed or scattered by the reflective layer). In the display of JP-A-8 110 495 (above), however, light undergoes multiple reflections as it is recycled. If, for example, the light undergoes 15 reflections in the display of JP-A-8 110 495, this will result in an overall intensity of $0.92^{15}=0.286$—that is, an intensity loss of over 70%.

In principle, the protrusions 28 could be made integral with the waveguide 26. In view of the required shape of the protrusions, however, this is likely to be difficult if not impossible. In a preferred embodiment, therefore, the waveguide 26 is manufactured with a flat exit face. The low refractive index material is then disposed with a uniform thickness over the entire exit face of the waveguide 26. The low refractive index material may be, for example, a light-transmissive resin, or a photoresist material.

The layer of low refractive index material 29 is then patterned, by removing the material from the regions where the protrusions 28 are to be formed. This may be done by any suitable process such as, for example, photo-etching or irradiation. A reflective layer is then deposited; for example, a thin metallic layer may be deposited using a sputtering process. In this step the reflective layer will generally be deposited over the exposed portions of the waveguide where the low refractive index material 29 has been removed, as well as over the remaining portions of the low refractive index material 29. It is therefore necessary to remove any reflective material deposited on exposed portions of the waveguide, so leaving the reflective material only on the surfaces of the remaining portions of the low refractive index material 29 as shown in FIG. 3.

A material having a refractive index equal to or greater than the refractive index of the waveguide 26 is then disposed over the low refractive index material 29. The high refractive index material is disposed in the voids where the low refractive index material was removed, thereby forming the protrusion.

The high refractive index material may be a planarising layer that completely buries the low refractive index material 29, as shown in FIG. 3. This ensures that the upper face of the backlight is flat.

In a variant of this method, a thin layer of a material with a refractive index lower than the refractive index of the waveguide, for example a thin layer of $CaF_2$, is deposited over the entire surface of the waveguide. This material is then masked and etched, so that it is removed from the regions that are desired to become non-TIR regions. A layer of a material may then be deposited with uniform thickness and etched to form voids where the protrusions 28 will be formed. This method has the advantage that the layer of material that is shaped to form voids where the protrusions 28 will be formed is not required to have a lower refractive index than the waveguide, but may have a higher refractive index than the waveguide 26 since the thin layer of $CaF_2$ (or other low refractive index material) will ensure that total internal reflection occurs. (The protrusions 28 are again shaped so as to direct light extracted from the waveguide into desired angular ranges.) This increases the number of materials that may be used, and also has the advantage that materials with higher refractive index are generally easier to work than materials with a low refractive index.

When the backlight is in operation, light from the or each light source enters the waveguide 26 and propagates through the waveguide. As light is extracted from the waveguide in the non-TIR regions of the front face of the waveguide, the intensity of light remaining in the waveguide decreases. This can lead to the backlight having a non-uniform intensity, with the intensity being highest near a light source and decreasing with increasing distance away from a light source. In order to compensate for this, the non-TIR regions of the front face of the waveguide may have an area that increases as the distance away from the nearest light source 27 increases. In the embodiment of FIG. 3, the area of the non-TIR regions may be increased by increasing the input aperture of the protrusions 28.

In an embodiment such as that of FIG. 3 where two light sources are provided, adjacent to opposite side edges of the waveguide 26, the input aperture of the protrusions 28 would increase with increasing distance away from a light source, reaching a maximum at a point equidistant from the two light sources. In an embodiment in which only one light source was provided, the input aperture of the protrusions would increase across the entire width of the waveguide 26, being smallest near the light source and being greatest near the edge of the waveguide opposite to the side edge adjacent to the light source.

Figure 17A:
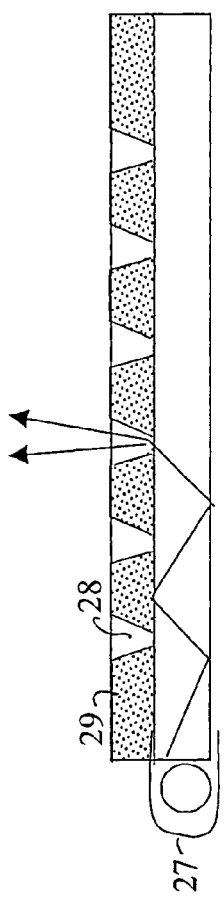
FIGS. 17A to 17C illustrate a further embodiment of the present invention.
Figure 17B:
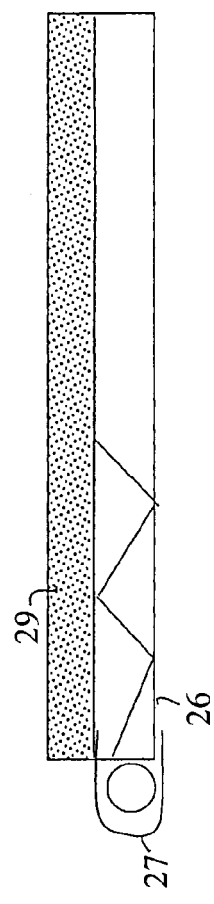
Figure 17C:
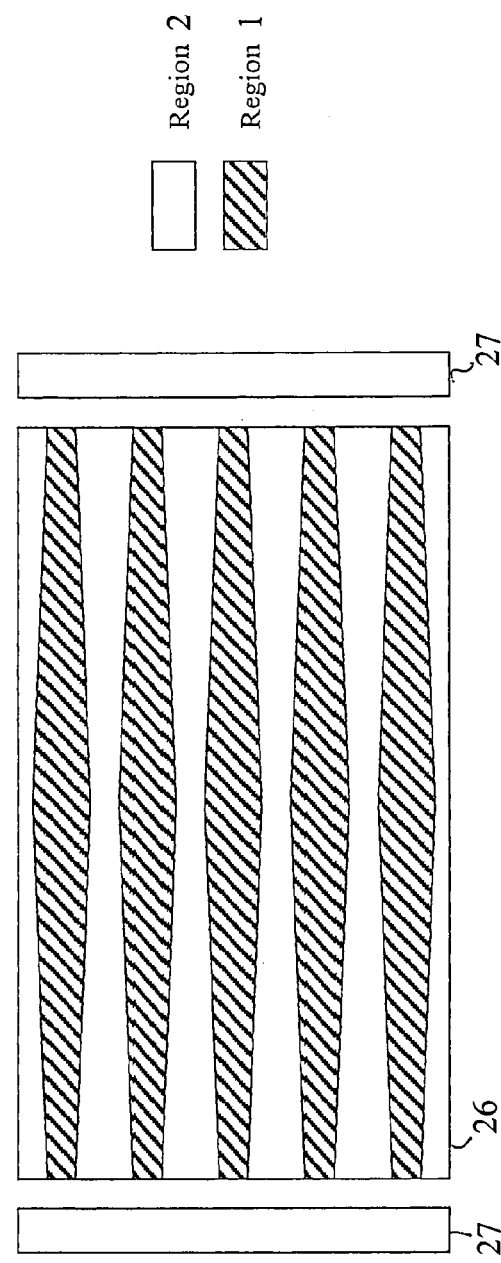
Figure 18:
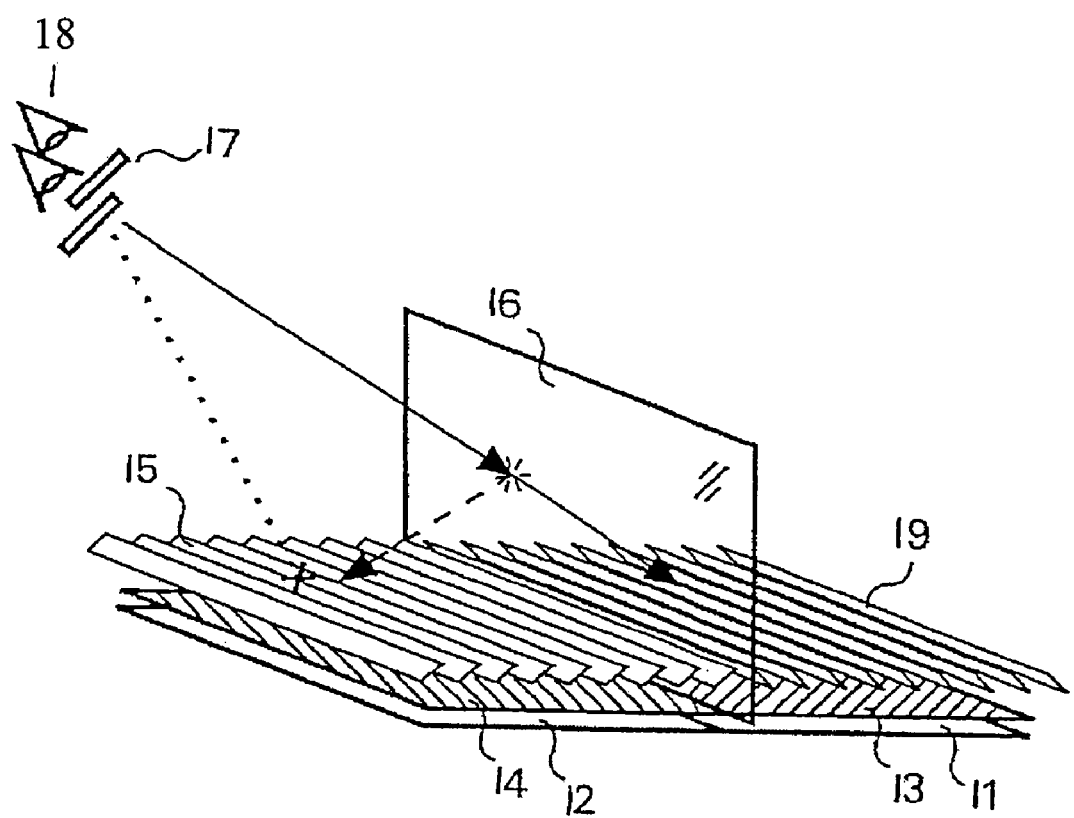
FIG. 18 is a schematic perspective view of a prior art display.

An alternative method of correcting for non-uniform intensity of the backlight is shown in FIGS. 17A to 17C. In this embodiment, the backlight 22 comprises a plurality of first regions where protrusions are provided, and FIG. 17A is a cross-section through a first region of the backlight. The backlight also comprises second regions where the protrusions are not present, and where the waveguide is overlaid by a uniform layer of low refractive index material 29, as shown in FIG. 17B which is a cross-section through a second region of the backlight. No light is therefore emitted from a second region of the backlight, since total internal reflection occurs over the entire area of the second region.

FIG. 17C is a plan view of the backlight of this embodiment. As can be seen, the width of the first regions, from which light is emitted, increases away from a light sources, and reaches a maximum equidistance between the two light sources. As a result, the width of the light-emitting area of the backlight increases, and the increasing width is chosen to compensate for the decrease in intensity with increasing distance from a light source.

Although the varying proportion between the first regions and second regions is clearly visible in FIG. 17C, in practice the respective proportions of the first and second regions would be varied at a scale that is unresolvable to the naked eye, so that the viewer perceived a uniform intensity of illumination over the entire area of the backlight.

In the embodiment of FIG. 17, the decrease in intensity away from the light sources 27 is compensated for by increasing the width of the first regions. It is therefore not necessary to adjust the input apertures of the protrusions 28, and the protrusions 28 may have the same shape and size over the entire area of all first regions (although, in principle, the variation of the intensity of the backlight over its area could be compensated for by a combination of varying the input apertures of the protrusions 28 and the use of first and second regions as in FIGS. 17A to 17C).

Additionally or alternatively to varying the input apertures of the protrusions or providing the first and second regions of FIG. 17A, the shape of the protrusions may also be varied over the width of the backlight, in order to compensate for the decrease in intensity of light propagating in the waveguide, away from the light sources 27. For example, a protrusion 28 may be shaped such that the surface that directs light from one light source has a different shape from a surface that directs light from a second light source, so as to compensate for a difference between the intensity of light from one light source and the intensity of light from the second light source light—for example, in the case of a protrusion near an edge of the waveguide 26 that is much closer to one light source than to another. One example of this is shown in FIG. 7E.

Figure 7E:
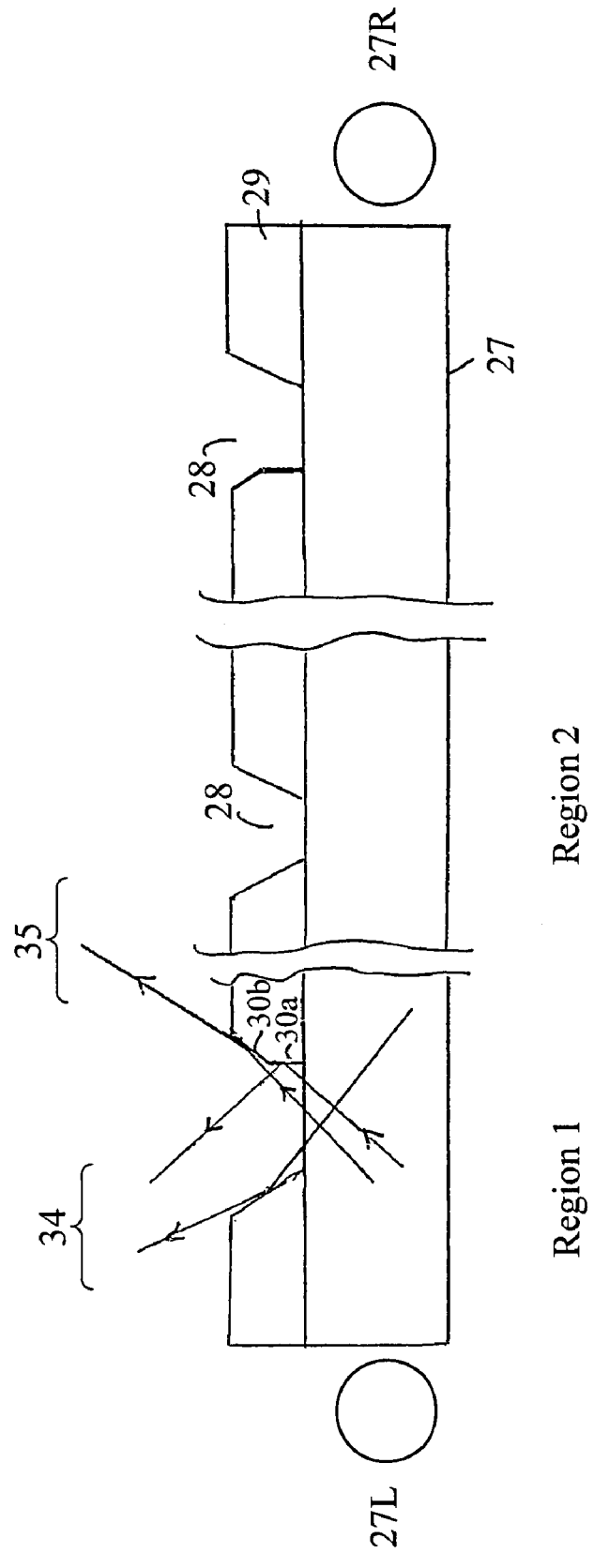

In region 1 of FIG. 7E, light from the left backlight 27L will have a high intensity, since region 1 is close to the left backlight. The surface of a protrusion 28 that directs light from the left backlight is therefore profiled as shown in FIG. 7B. The vertical portion 30a of the light-directing surface directs light from the left backlight into the angular range 34 that illuminates the right image, and the inclined portion 30b of the light-directing surface directs light from the left backlight into the angular range 35 that illuminates the left image. The surface of a protrusion that directs light from the right backlight 27R, is however profiled as shown in FIG. 7A, so that all light from the right backlight (which will have a low intensity, since region 1 is distant from the right backlight) is directed into the angular range 34 that illuminates the right image. Thus, light directed into the angular range 34 that illuminates the right image includes all light from the right backlight and some light from the left backlight, whereas light directed into the angular range 35 that illuminates the left image includes only part of the light from the left backlight—thereby compensating for the fact that, in region 1, light from the left backlight 27L has a much higher intensity than light from the right backlight 27R.

Conversely, in region 3 which is close to the right backlight 27R, the surface of a protrusion 28 that directs light from the right backlight is profiled as shown in FIG. 7B, whereas the surface of a protrusion 28 that directs light from the left backlight is profiled as shown in FIG. 7A. Thus, light directed into the angular range 34 that illuminates the right image includes part of the light from the right backlight, whereas light directed into the angular range 35 that illuminates the left image includes part of the light from the right backlight in addition to the light from the left backlight 27L—thereby compensating for the fact that, in region 3, light from the right backlight 27R has a much higher intensity than light from the left backlight 27L.

In region 2, which is substantially equidistant from the two light sources, the protrusions 28 are symmetric, in that the surface of a protrusion that directs light from the left backlight has the same profile as the surface that directs light from the right backlight.

The embodiment of FIG. 7E is not limited to the particular protrusions of FIGS. 7A and 7B. In general, the profile of the light-directing surfaces of the protrusions may be varied in any way that compensates for a difference in intensity between light from the left backlight 27L and light from the right backlight 27R.

The display 20 of FIG. 3 has been described with particular reference to a dual-view display. However, the display may also be adopted to act as a 2-D display by arranging the light-directing surfaces 30 appropriately. As stated above, to provide a dual view display, one light extraction point is preferably provided for every pair of a left pixel column and a right pixel column, but in the case of a conventional 2-D display one light extraction point (or more) is required for each pixel column. Moreover, application to a 2-D display would require arranging the light-directing services 30 such that the majority of light is emitted along or close to the normal axis of the display (or along another intended viewing direction, if the intended viewing direction is not the normal axis of the display), so that an observer viewing the display from an on-axis position will see a bright 2-D image.

Figure 8A:
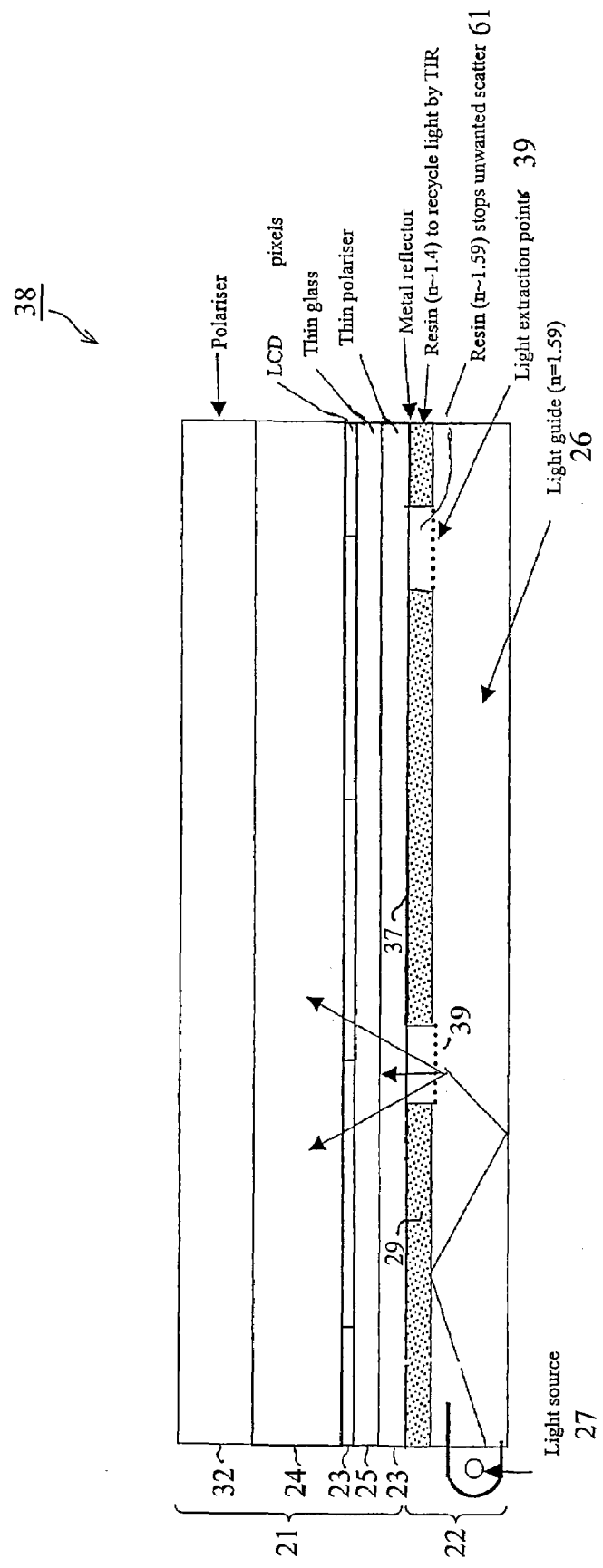
FIG. 8A is a schematic sectional plan view of a display according to a second embodiment of the present invention.

FIG. 8A is a schematic plan sectional view through a display 38 according to a second embodiment of the present invention. The display 38 again comprises a transmissive spatial light modulator 21 disposed in front of a backlight 22. The SLM 21 may be any conventional SLM, and will not be described in detail. It will be assumed for the purpose of description that the SLM 21 comprises a liquid crystal layer, but the invention is not limited to this.

The backlight again comprises a waveguide 26 that is illuminated by one or more light sources 27 disposed along respective side edges of the waveguide 26. Most of the exit face of the light guide 26 is totally internally reflective to light propagating within the waveguide, but the front face of the waveguide comprises a plurality of regions 39 that are not totally internally reflective for light propagating within the waveguide. These non-TIR regions 39 form "light extraction points" at which light is extracted from the waveguide 26.

In the display 38, the exit face of the waveguide 26 is provided with a scattering structure to create the non TIR regions. For example, microprisms may be disposed at the selected regions of the exit face of the waveguide 26 to make those regions non totally internally reflective to light propagating within the waveguide. Alternatively, the surface of the waveguide 26 may be mechanically roughened to produce a scattering surface and thereby define the non-TIR regions 39.

Regions of the exit face of the waveguide 26 where no scattering structure is provided remain totally internally reflective for light propagating within the waveguide. In order to ensure that no light is emitted from these regions, a material 29 having a refractive index lower than the refractive index of the waveguide may be deposited over the exit face of the waveguide, apart from over the light extraction points 39, to ensure that total internal reflection occurs. Additionally or alternatively, a reflective layer 37 (such as a thin metallic layer) may be provided over the waveguide 26, apart from over the light extraction points 39, to ensure that no light is emitted from the waveguide in regions other than the light extraction points 39. In FIG. 8A the reflective layer 37 is shown as being provided over the upper surface of the low refractive index material 29. Preferably the reflective layer 37 is also provided at the interfaces between the low refractive index material 29 and the material 61 (to be described below), but this may be difficult to achieve in practice.

Figure 8B:
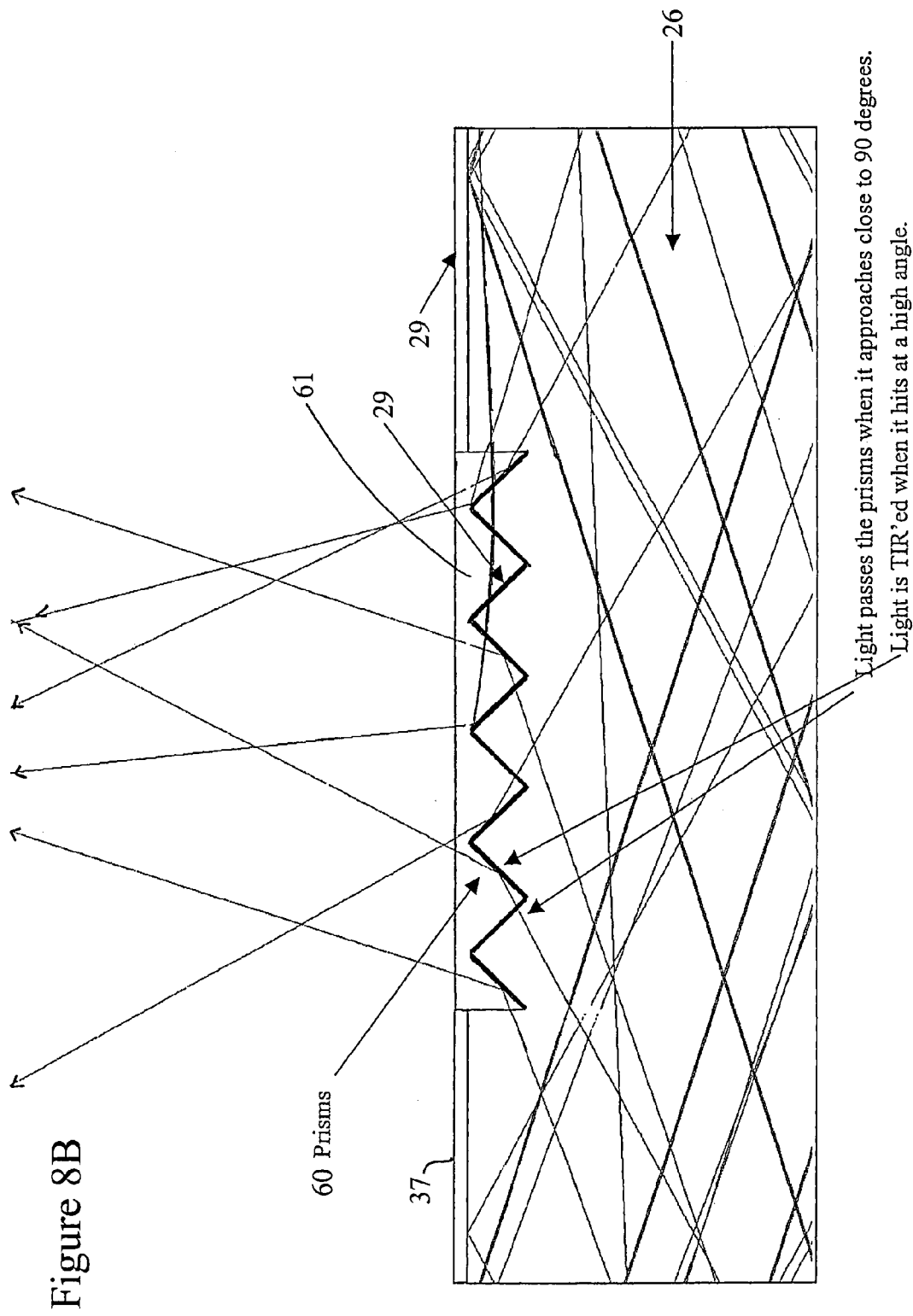
FIG. 8B is an enlarged view of part of FIG. 8A.

FIG. 8B is a partial enlarged view of FIG. 8A showing one of the light extraction points 39. FIG. 8B shows a display in which the layer of low refractive index material 29 is disposed directly on the exit surface of the waveguide between adjacent light extraction points. The low refractive index material 29 may be, for example calcium fluoride ($CaF_2$)

In FIG. 8B, the exit surface of the waveguide 26 is provided with microprisms 60 to extract light from the waveguide 26. Light that is incident on a surface of a microprism at an angle of 90° or close to 90° to the surface of the microprism is not reflected, but passes out of the waveguide. However, light that is incident on a surface of a microprism at an angle of close to 0° to the surface of the microprism is internally reflected. Light is emitted from the waveguide into an angular range; for microprisms that are symmetric about the normal of the display, as shown in FIG. 8B, light is emitted into an angular ranges centred about the normal axis of the display. The extent of the angular ranges is determined by the prism angle of the microprisms 60.

The layer of material 29 with a low refractive index preferably extends over the microprisms 60 as shown in FIG. 8B. This prevents light from being emitted in directions outside the two desired angular ranges as a result of any imperfections in the surfaces of the microprisms 60.

A material 61 with a high refractive index, equal to or greater than the refractive index of the waveguide 26, is placed over the light extraction points in FIGS. 8A and 8B. This may be, for example a light-transmissive adhesive with a high refractive index, to adhere the waveguide 26 to the polariser 33.

It might be thought that the presence of the material 61 with a high refractive index would be sufficient to extract light from the waveguide, as total internal reflection would not occur at the interface between the waveguide and the high refractive index material 61. However, although total internal reflection would occur, light extracted from the waveguide would propagate almost parallel to the plane of the waveguide, and it is likely that this light would undergo total internal reflection at the front face of the display and so would be trapped within the display. Providing the microprisms 60 or other scatterers enables light to be extracted from the waveguide in desired angular ranges.

Where the embodiment of FIG. 8A is applied to a dual view display, for example, one light extraction point 39 is preferably provided for each pair of left and right pixel columns, with the centre of the light extraction point preferably being laterally aligned with the gap between a left pixel column and a right pixel column as shown in FIG. 8A. Each light extraction point is made relatively narrow, so that the light extraction points mimic the effect of illumination through a rear parallax barrier. It will be noted that some light is emitted along the normal axis and, when this embodiment is applied to a dual view display, this light will be incident on the black mask between the pixel columns and will be absorbed. However, the display of FIG. 8A is relatively simple to manufacture, and in many applications will provide a useful, low-cost dual view display.

Alternatively, when the embodiment of FIG. 8A is applied to a conventional 2-D display, one (or more) light extraction point 39 is preferably provided for each pixel column, with the light-directing surfaces of the microprisms 60 being arranged to direct light along the intended viewing direction of the display (which will usually be the normal direction).

Figure 9:
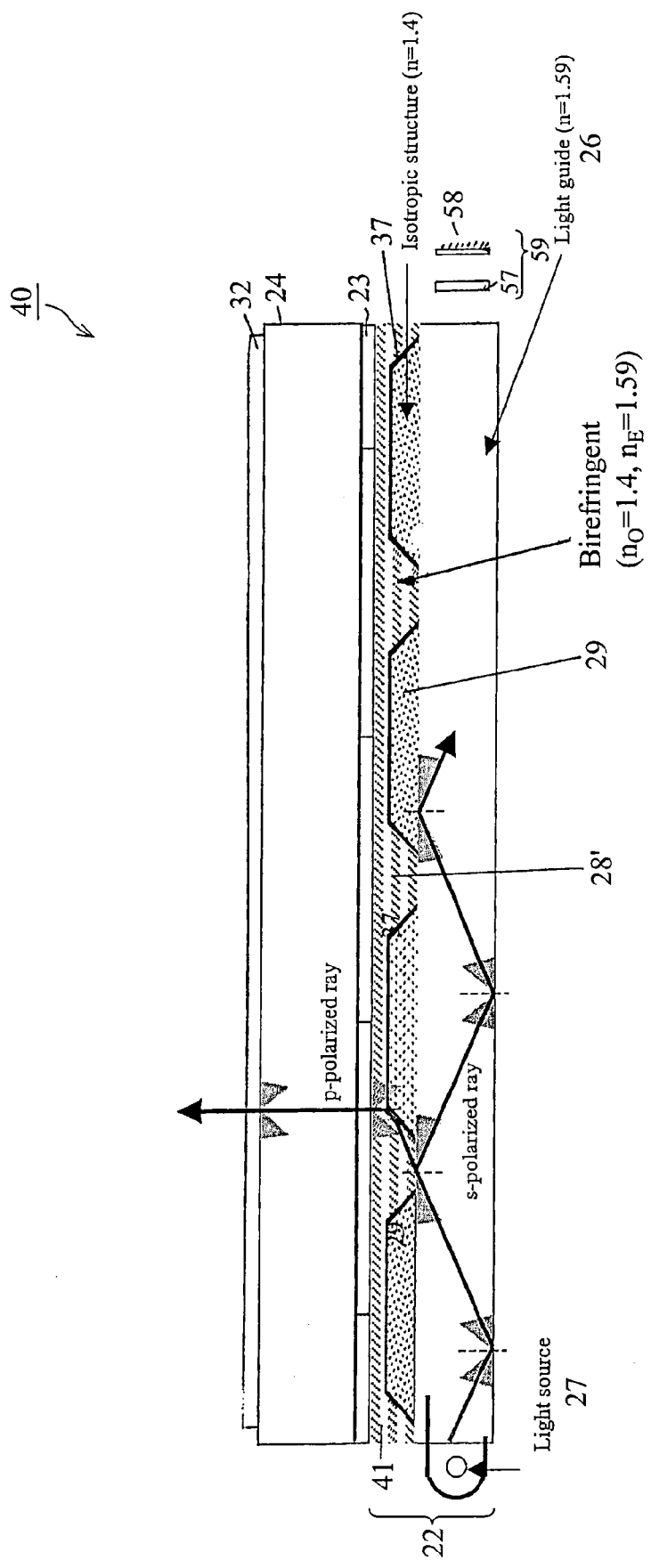
FIG. 9 is a schematic sectional plan view of a display according to a third embodiment of the present invention.

FIG. 9 is a schematic sectional plan view of a display 40 according to a third embodiment of the present invention. The display 40 again comprises a transmissive pixellated spatial light modulator 21 and a backlight 22 provided for illuminating the spatial light modulator 21. The display 40 corresponds generally to the display 20 of FIG. 3, and the description of components common to both displays will not be repeated.

In the display 40, a birefringent material 41 is disposed over the exit face of the waveguide 26 of the backlight at regions where it is desired that light is extracted from the waveguide 26. The birefringent material 41 is disposed immediately adjacent to the exit face of the substrate at these locations, so that the regions of the exit face of the substrate where the birefringent material 41 is provided become non-totally internally reflecting for light of a first polarisation state. This requires that the birefringent material 41 has a refractive index for light of the first polarisation state that is not lower than the refractive index of the waveguide 26 for light of that polarisation, so that total internal reflection does not occur for light of the first polarisation state at the interface between the waveguide 26 and the birefringent material 41. The birefringent material is further chosen such that its refractive index for light of a second polarisation state, different from the first polarisation state (and preferably orthogonal to the first polarisation state), is lower than the refractive index of the waveguide 26 for the second polarisation state, so that light of the second polarisation undergoes total internal reflection at the boundary between the waveguide 26 and the birefringent material 41.

It can be seen from the above description that the backlight 22 of FIG. 9 is a polarising backlight—the light extracted from the waveguide contains only one polarisation state. (In the specific embodiment shown in FIG. 9 only the p-polarisation state is extracted from the waveguide.) As a result, the lower polariser 33 of the image display device of FIG. 3 is not required. This further allows the lower substrate 25 of the image display device also to be omitted, with the waveguide 26 serving as the lower substrate of the image display device.

Regions of the exit face of the waveguide 26 where it is desired that no light is extracted from the waveguide are coated with a material 29 having a refractive index lower than the refractive index of the waveguide for light of both polarisations. The material 29 may conveniently be an optically isotropic material having a refractive index lower than the refractive index of the waveguide 26.

FIG. 9 illustrates a display in which the waveguide 26 has a refractive index n=1.59. The birefringent material 41 has an ordinary refractive index $n_o$=1.4, and has an extraordinary refractive index $n_e$=1.59. As a result, s-polarised light undergoes total internal reflection at the interface between the waveguide and the birefringent material, whereas p polarised light is not totally internally reflected at the boundary between the waveguide and the birefringent material but is extracted from the waveguide. The low refractive index material 29 provided where it is desired to extract no light from the waveguide is an optically isotropic material with a refractive index n=1.4.

In the embodiment of FIG. 9, it is preferable that the birefringent material 41 is provided in the form of protrusions 28' having a similar form to the protrusions 28 of the display 20 of FIG. 3. As a result, light extracted from the waveguide is directed by a reflective layer 37 disposed on the light-directing surfaces of the protrusions 28'. The light-directing surfaces of the protrusions 28' are shaped so as to direct light into angular range(s) which depend on the intended application of the display. FIG. 9 shows light being emitted along the normal axis, and this is appropriate for a conventional 2-D display—this application would require arranging the light-directing services 30 such that the majority of light is emitted along, or close to the normal axis of the display, so that an observer viewing the display from an on-axis position will see a bright 2-D image. If the embodiment of FIG. 9 is applied to a dual-view display, however, it would necessary to shape the light-directing surfaces of the protrusions 28' so as to direct light into two angular ranges, preferably disposed on opposite sides of the normal axis (and also to provide preferably one light extraction point for each pair of left and right pixel columns).

A reflective layer 37, for example a thin metallic layer, may be provided over the low refractive index material 29. This ensures that any light extracted from the waveguide at the interface between the waveguide and the low refractive index material 29 is reflected back into the waveguide.

The shape of the protrusions 28' of the display 40 may be shaped in any of the ways described above for the protrusions 28 of the display 20 of FIG. 3. In particular, they may be shaped as described in any of FIGS. 6A, 6B, 7A or 7B. Furthermore, the input apertures of the protrusions 28' may be varied as described above to provide uniform intensity of illumination over the entire area of the backlight; alternatively, the protrusions may be provided in regions of varying width as shown in FIGS. 17A to 17C.

In a preferred embodiment of FIG. 9, the waveguide 26 is made of a birefringent material. In this case, the polarisation component that undergoes total internal reflection at the interface between the waveguide 26 and the birefringent material 41 (in the case of FIG. 9, the s-polarised component) will undergo a change in polarisation state as it propagates through the waveguide, and will eventually transform into the p-polarisation component. This will allow the light to be extracted from the waveguide 26, since, once it has been transformed to the p-polarisation component it will not longer undergo internal reflection at the interface between the waveguide 26 and the protrusions 41 but will be extracted from the waveguide.

Additionally, or alternatively, it is possible to provide a reflective polarisation converter 59 adjacent the side edge of the waveguide opposite to the side edge where a light source 27 is provided. Light from the light source that is not extracted from the waveguide will be emitted from the side edge face of the waveguide opposite to the side edge face adjacent to the light source, will be reflected and will have its polarisation state changed by the reflective polarisation converter 59, and will be recycled back into the waveguide 26. In the example of FIG. 9, the polarisation converter 59 would convert the s-polarised light emitted from the waveguide after having passed through the waveguide without being extracted into the p-polarisation component, and return the light as the p-polarisation component to the waveguide. The returned light can now be extracted from the waveguide, since the p-polarisation component does not undergo internal reflection at the interface between the waveguide 26 and the birefringent material 41.

The reflective polarisation converter 59 may be formed of a quarter waveplate 57 and a mirror 58.

A suitable birefringent material 41 for use in the display 40 of FIG. 9 could be, for example, a reactive mesogen. The low refractive index material 29 may be, for example, a light-transmissive resist deposited and patterned as described above; a reactive mesogen is then disposed over and between the structures of the low refractive index material 29.

Figure 10B:
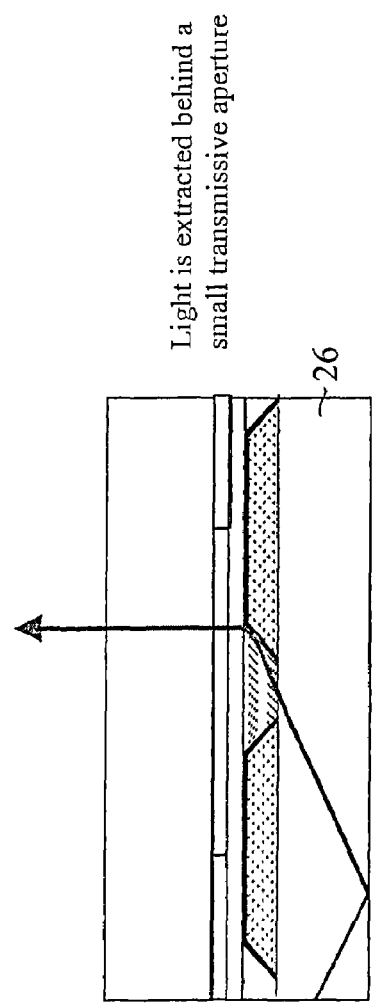
FIGS. 10A to 10C illustrates the invention applied to a transflective display.
Figure 10C:
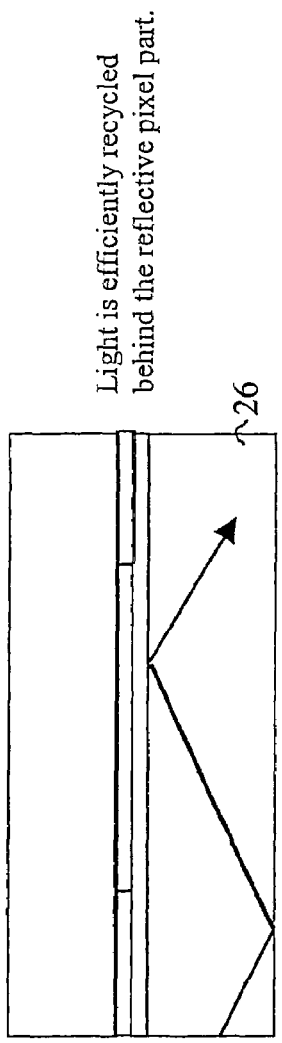
Figure 10A:
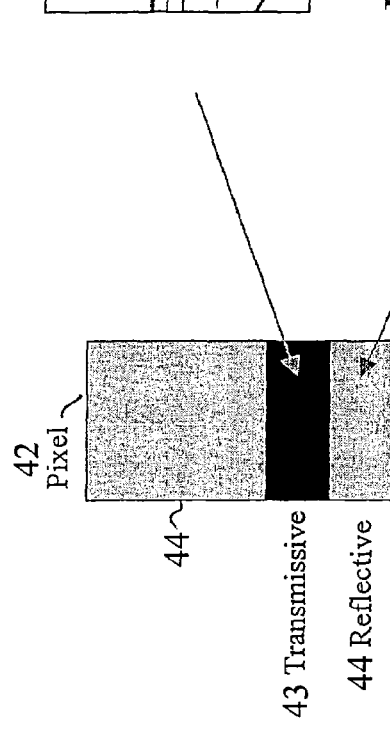

FIGS. 10A to 10C illustrate how the present invention may be applied to a display that is intended to act either as a transmissive display or reflective display. Such displays are well known, and are particularly used in the case of portable, battery-powered equipment where it is desired to minimise the energy consumption in order to increase the battery lifetime. Such displays act as reflective displays in conditions of high ambient illumination, and are provided with a backlight so that they can act as a conventional transmissive display in conditions of low ambient illumination.

FIG. 10A shows a pixel for use in such a display. As can be seen, the pixel 42 comprises one or more transmissive portions 43 and one or more reflective portions 44. In conditions of high ambient illumination, the reflective portion(s) of the pixel display an image using reflected ambient light whereas the transmissive portion 43 of the pixel does not display an image since the backlight is switched off. In conditions of low ambient light the backlight is switched on, and an image is displayed on the transmissive portion 43 of the pixel.

The transmissive portion 43 of the pixel 42 may have a structure as described above, for example with reference to FIG. 3, 8 or 9. In the transmissive region 43, the backlight is provided with non-TIR regions to allow light to be extracted from the waveguide 26 of the backlight. This is shown schematically in FIG. 10B.

In the reflective regions of the pixel, no protrusions 28, 28' or scattering regions are provided on the front face of the waveguide, so that no light is extracted from the waveguide. Any light emitted into a part of the waveguide that corresponds to a reflective region 44 of the pixel is trapped within the waveguide, and propagates through the waveguide until it reaches a transmissive portion 43 of the pixel where protrusions 28, 28' or other structure are provided for extracting light from the waveguide.

A uniform transmissive layer, for example a resin layer, is preferably provided over the waveguide in the reflective regions 44, to make the overall thickness of the waveguide and the uniform transmissive layer in the reflective regions equal to the thickness of the waveguide, protrusions, and any planarising layer in the transmissive region 43.

Applying the teaching of the present invention to a pixel 42 having reflective and transmissive portions has the advantage that, as explained above, a display of the present invention has a much higher intensity than a conventional display. For a given pixel size, therefore, the transmissive portion 43 can be made much smaller while providing the same overall pixel intensity. The reduction in size of the transmissive portion of the pixel means that the area of the pixel 42 that is reflective is increased, and this increases the intensity of the display when it is operating in reflective mode in conditions of high ambient illumination. It is expected that it should be able to increase the intensity of the display, in reflection mode, by a factor of around 2-3.

Figure 2:
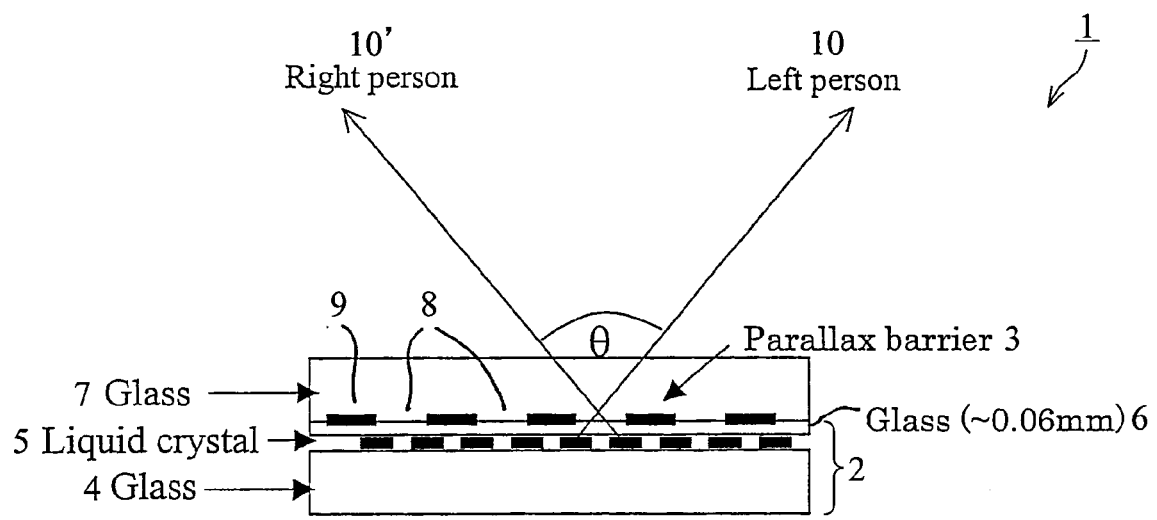
FIG. 2 is a schematic plan sectional view of a conventional dual view display.
Figure 11A:
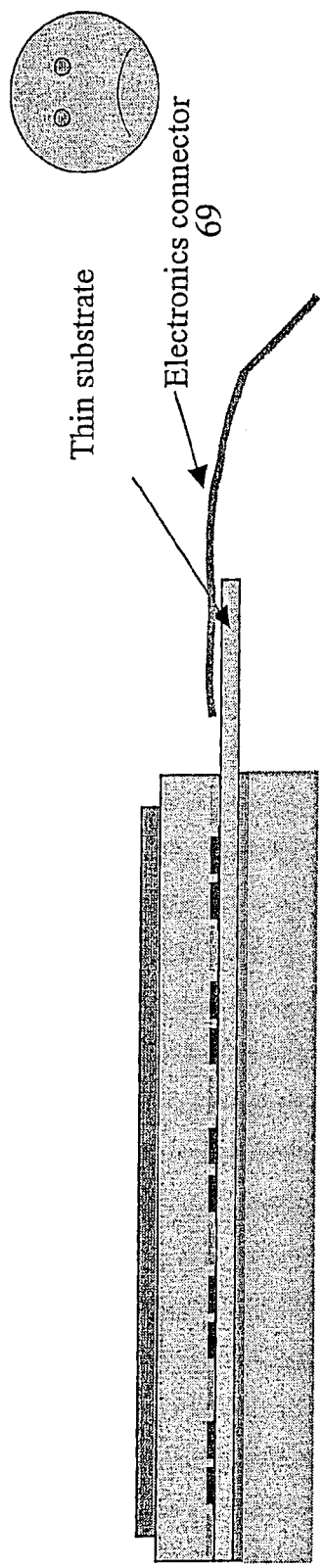
FIG. 11A illustrates electrical connection to a conventional display.

In a conventional dual view display such as that shown in FIG. 2, the rear substrate 4 of the display is a TFT (thin film transistor) substrate, on which are provided thin film transistors for addressing the pixels of the liquid crystal layer. In a display of the present invention, it is desired to place the backlight as close to the pixels of the liquid crystal layer as possible, to ensure that each pixel is illuminated by light travelling in the appropriate angular range. It might appear that this could be done by reducing the thickness of the TFT substrate 25 of the SLM, for example using an etching process. This is, however, unsatisfactory, as shown in FIG. 11A. A problem arises because it is necessary for the TFT substrate to support an electronics connector 69, to enable the thin film transistors disposed on the substrate to be connected to external circuitry. In order to ensure good alignment between the backlight and the pixels it is desirable that the rear substrate 25 has a thickness of around 50 µm, but a substrate having this thickness would be too weak to support an electronics connector 69.

This problem does not arise in a conventional display, in which the parallax barrier is provided in front of the liquid crystal layer as in FIG. 2. The display 1 of FIG. 2 can be manufactured by providing the SLM with a thin front substrate 6, since the front substrate does not need to support an electronics connector.

Figure 11B:
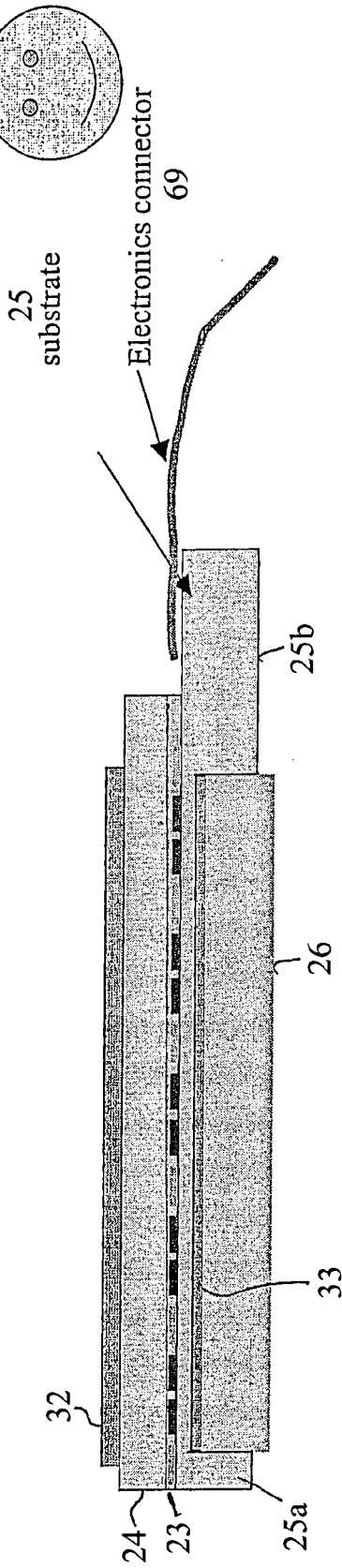
FIG. 11B illustrates one implementation of electrical connection to a display of the present invention.

FIG. 11B shows one possible solution to this problem. In this embodiment, the rear substrate 25 of the SLM is reduced in thickness only over the active area of the display. Portions of the rear substrate 25 that are outside the active area of the display, such as the portions 25a, 25b in FIG. 11B retain their full thickness, and the rear substrate 25 thus remains sufficiently strong to be able to support an electronics connector 69. In this embodiment, the rear polariser 33 of the SLM and the backlight 22 are received in the recess in the rear substrate 25 of the SLM. (It is however necessary that the waveguide 26 partially projects from the substrate 25, as shown in FIG. 11B, so that one or more light sources can be provided adjacent a side edge face of the waveguide 26.)]

Figure 12:
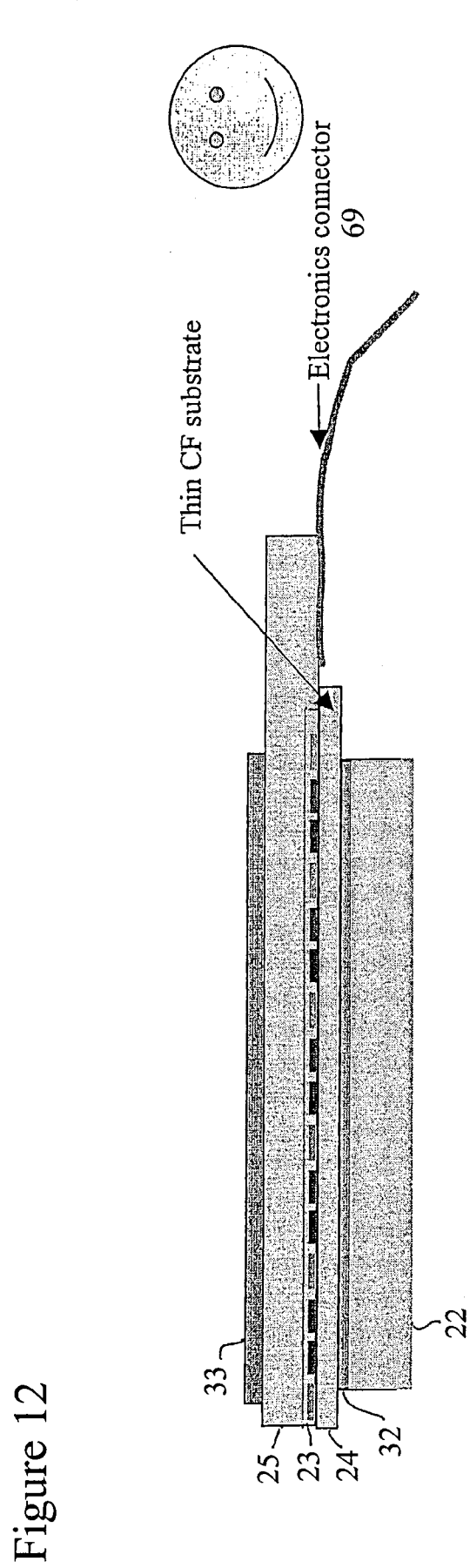
FIG. 12 illustrates a second implementation of electrical connection to a display of the invention.

FIG. 12 shows an alternative solution. In FIG. 12, the SLM has been turned "upside down" compared to FIG. 11A, so that the TFT substrate 25 is now the exit substrate of the SLM. The backlight 22 is spaced from the liquid crystal layer 23 by the colour filter substrate 24 in this embodiment—and the colour filter substrate 24 is not required to support an electronics connector. The colour filter substrate 24 can then be made thin, so that the backlight 22 can be placed relatively close to the liquid crystal layer 23. The TFT substrate can be made thick to support an electronics connector 69.

The display shown in FIG. 12 has the possible problem that the film transistors on the TFT substrate may be affected by light from the backlight, since this will now be incident on the front faces of the TFTs rather than on their rear faces. However, tests on a display for a mobile telephone have suggested that this problem may not be significant. Moreover, the intensity of light incident on the TFTs will be relatively low, for two reasons: firstly, since relatively little light is absorbed in the parallax barrier or otherwise lost in a display of the invention, a given intensity of displayed image can be achieved with a lower intensity backlight in a display of the invention than in a conventional display, so that there is a lower intensity of light passing through the display than there is in a conventional parallax barrier display and, secondly, the light-directing surfaces of the protrusions 28, 28' of the displays of FIGS. 3 and 10 direct light to the active areas of the pixels rather than to regions of the liquid crystal layer covered by the black mask, and this means that relatively little light will be incident on the TFTs. Furthermore, it may even be possible to arrange the black mask to mask the TFTs from light from the backlight.

A second possible problem with the display of FIG. 12 is that ambient light incident on the display may be reflected by the back faces of the TFTs, leading to a reduction in the contrast of the display. However, it may be possible to overcome this problem by masking the back faces of the TFTs using the black mask. (If it was desired to mask the TFTs from both the backlight and ambient light, it would be necessary to provide two black masks, one on each side of the TFTs.)

Figure 13:
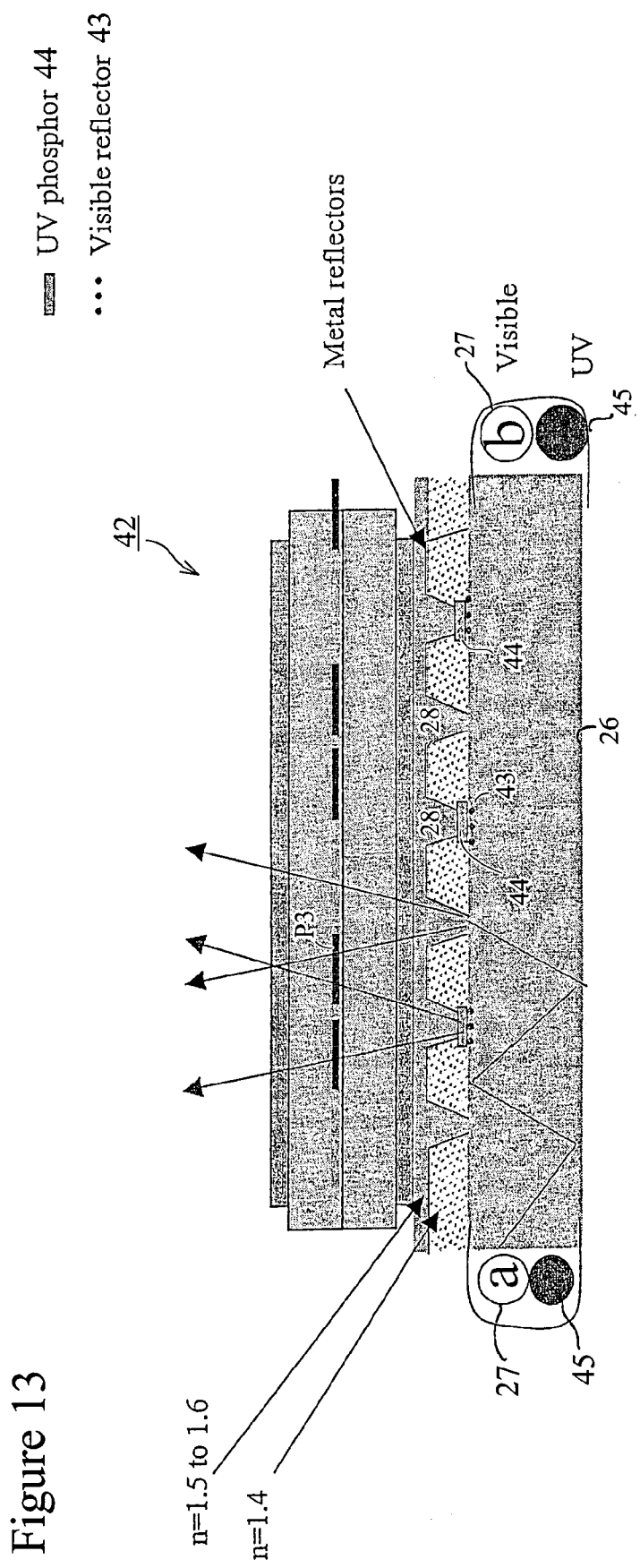
FIG. 13 is a schematic sectional plan view of a modified embodiment of the display of FIG. 3.

FIG. 13 is a schematic sectional view through a further display 42 of the present invention. The display 42 corresponds generally to the display 20 of FIG. 3, and the description of components that are the same in both displays will not be repeated here.

In the display 42, a filter 43 that is non-transmissive to visible light is disposed at the interface between selected ones of the protrusions and the waveguide 26. FIG. 13 shows a filter 43 disposed at the interface between every other protrusion 28 and the waveguide 26, but the invention is not limited to this particular arrangement of the filters 43.

A layer of luminescent material 44 is disposed above each filter 43, between the filter 43 and the associated protrusion 28. For protrusions 28 where the filter 43 is not provided at their interface with the waveguide 26, the luminescent material 44 is also not provided.

The luminescent material 44 emits visible light when illuminated by a pre-determined wavelength that is outside the visible spectrum. The filter 43 is chosen such that it will transmit the selected wavelength required to cause the luminescent material 44 to emit visible light, while blocking visible light. The filters 43 are preferably reflective to visible light, so that visible light incident on the filters is returned to the waveguide.

The display 42 comprises at least one source 27 of visible light and at least one source 45 of light of the selected wavelength to cause the luminescent material to emit visible light.

In the embodiment of FIG. 13, the luminescent material 44 comprises a phosphor that is sensitive to ultraviolet light, and that emits visible light when irradiated by ultraviolet light. The or each second light source 45 is therefore a source of ultraviolet light. The or each second light source does not emit visible light.

When the visible light source(s) 27 and the UV light source (s) 45 are both switched on, visible light is extracted from the waveguide at every protrusion 28 where a filter 43 and luminescent material 44 are not provided. Where a filter and luminescent material are present, visible light from the light source 27 is blocked by the filter 43, and only the UV light from UV light source 45 is incident on the luminescent material. The luminescent material 44 then emits visible light as a consequence of its irradiation by UV light. As a result, every protrusion 28 transmits light into the SLM 21, either as the result of extraction of visible light from the waveguide or as the result of extraction of UV light and its conversion to visible light. As a result, the pixels of the display are illuminated by light travelling in essentially all directions, and a conventional single view display mode is obtained.

If the UV light is switched off, and the or each visible light source 27 is switched on, the display operates as a dual view display. When the visible light source only is switched on, light is extracted from the waveguide only at the protrusions 28 where the filter 43 and luminescent material 44 are not provided. The display 42 can therefore be switched from single view mode to a dual view mode simply by switching the or each UV light source 45ON or OFF. The same effect could be achieved by switching the visible light source ON and OFF while keeping the UV light source on continuously.

In the display of FIG. 13, the pitch of the protrusions 28 where the filter 43 and luminescent material 44 are not provided is preferably substantially equal to twice the pixel pitch, so that there is one light extraction point for each pair of left and right pixel columns when the display operates in the dual-view mode. This can conveniently be achieved by making the pitch of the protrusions 28 equal to the pixel pitch and providing the filter 43 and luminescent material 44 under every other protrusion as shown in FIG. 13. This arrangement has the further advantage that, when both the visible light source(s) 27 and the UV light source(s) 45 are illuminated to give a 2-D display, there is substantially one light extraction point for each pixel column. (As is known, it is preferable that the pitch of the light extraction points is not exactly equal to twice the pitch of the pixel columns, in the same way it is preferable that the pitch of a parallax barrier in a dual view display is not exactly equal to the pitch of the pixel columns, in order to provide "viewpoint correction".)

When the display 42 is switched from a single view mode to a directional mode such as a dual view display mode, the resolution of the display will be decreased by a factor of 2, as each image is displayed only on every other column of pixels. In order to maintain a high resolution in a directional display mode, it is possible to operate the display 42 by switching the UV light source(s) 45 and the visible light source(s) 27 every other video frame. As is indicated in FIG. 13, when the visible light source(s) 27 only are ON, a pixel p3 is illuminated with light travelling in one angular range, whereas when only the UV light source(s) is ON the same pixel p3 is illuminated by light travelling in a second angular range. Thus, by switching between the visible light source(s) and the UV light source(s) every other frame, and time-multiplexing two images on the liquid crystal layer, a full resolution directional display mode may be obtained.

It is also possible to switch between visible light source A and visible light source B to obtain a full resolution display by time multiplexing. When only visible light source A is ON light is emitted generally to a left observer, and when only visible light source B is ON light is emitted generally to a right observer.

Figure 14:
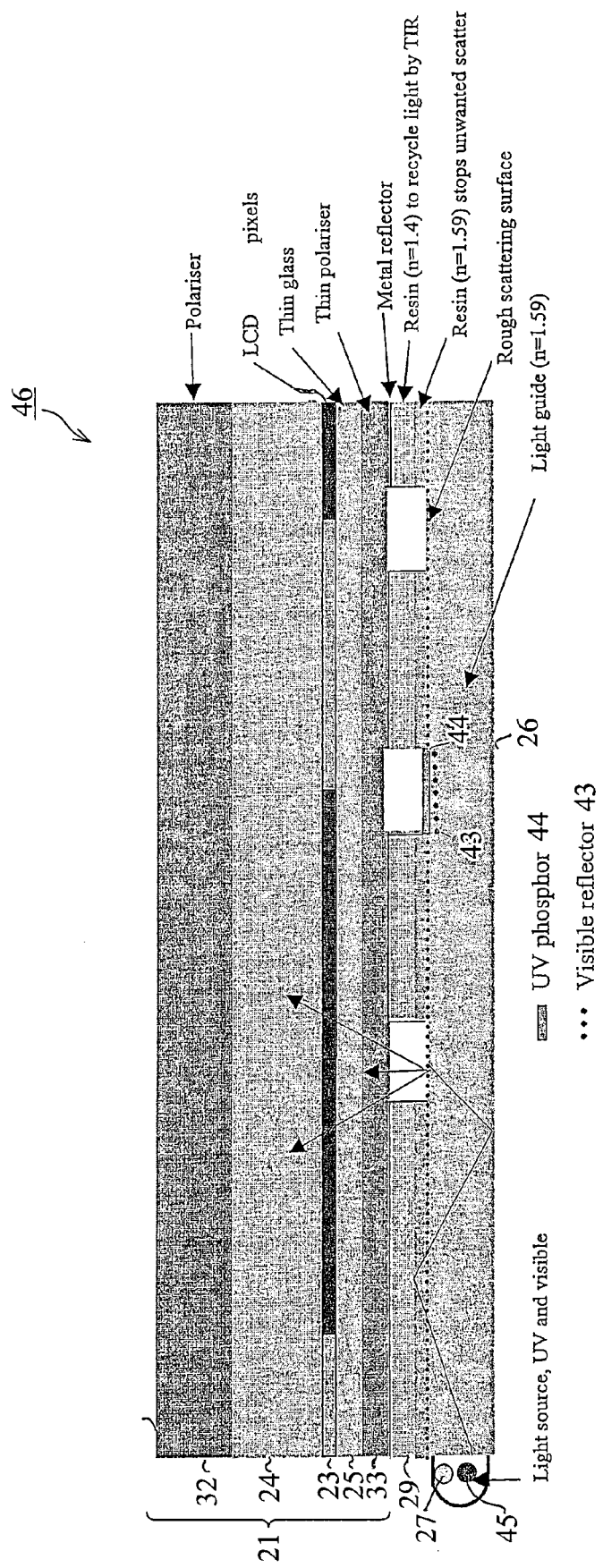
FIG. 14 is a schematic sectional plan view of a modified embodiment of the display of FIG. 8.

FIG. 14 is a schematic sectional view of a display 46 according to a further embodiment of the present invention. The display 46 corresponds generally to the display 38 of FIG. 8, and the description of components common to both displays will not be repeated.

The display 46 of FIG. 14 again incorporates a filter 43 that blocks (and preferably is reflective for) visible light and that passes light of at least one selected wavelength outside the visible range, in this example UV light. A filter 43 is provided at every other light extraction region 39.

A layer of luminescent material 44 is disposed over the filter 43, but is not provided at light scattering regions where the filter 43 is not provided.

The display has at least one visible light source 27, and at least one light source that emits light of a wavelength, outside the visible region of the spectrum, that causes the luminescent material 44 to emit visible light. In this embodiment the light source 45 is a UV light source.

When the light source 27 and the UV light source are both ON, light is transmitted into the SLM 21 at every light extraction point. At a light extraction point where a filter 43 and luminescent material 44 are provided, visible light is generated as a result of irradiation of the luminescent material 44 by UV light from the UV light source 45. The luminescent material 44 may be a suitable UV sensitive phosphor.

Visible light is extracted from the waveguide 26 at light extraction points 39 where the filter 43 and luminescent material 44 are not present.

As explained with reference to FIG. 13 above, if the visible light source 27 and the UV light source 45 are both ON, the display 46 operates in a single view display mode. If only the visible light source 27 is ON, the display 46 operates in a directional display mode, for example a dual view display mode, and a directional display mode may also be obtained by illuminating only the UV light source 45.

The display 46 may also be driven by switching between the visible light source 27 and the UV light source every other video frame, and displaying two images in time-multiplex manner on the liquid crystal layer 23. This allows a full resolution dual view display mode to be obtained by time multiplexing.

If visible light sources are provided against two opposed side edge faces of the waveguide 26, the display 46 may also be driven by switching between one visible light source and the other visible light source every other video frame, and displaying two images in time-multiplex manner on the liquid crystal layer 23. This allows a full resolution dual view display mode to be obtained by time multiplexing as described with reference to FIG. 13 above.

In the display of FIG. 14, the pitch of the light extraction points where the filter 43 and luminescent material 44 are not provided is preferably substantially equal to twice the pixel pitch, so that there is one light extraction point for each pair of left and right pixel columns when the display operates in the dual-view mode. This can conveniently be achieved by making the pitch of the light extraction points substantially equal to the pixel pitch and providing the filter 43 and luminescent material 44 at every other protrusion as shown in FIG. 14. The arrangement has the further advantage that, when both the visible light source(s) 27 and the UV light source(s) 45 are illuminated to give a 2-D display, there is one light extraction point for each pixel column. (As is known, it is preferable that the pitch of the light extraction points is not exactly equal to twice the pitch of the pixel columns, in the same way it is preferable that the pitch of a parallax barrier in a dual view display is not exactly equal to the pitch of the pixel columns, in order to provide "viewpoint correction".)

Figure 15:
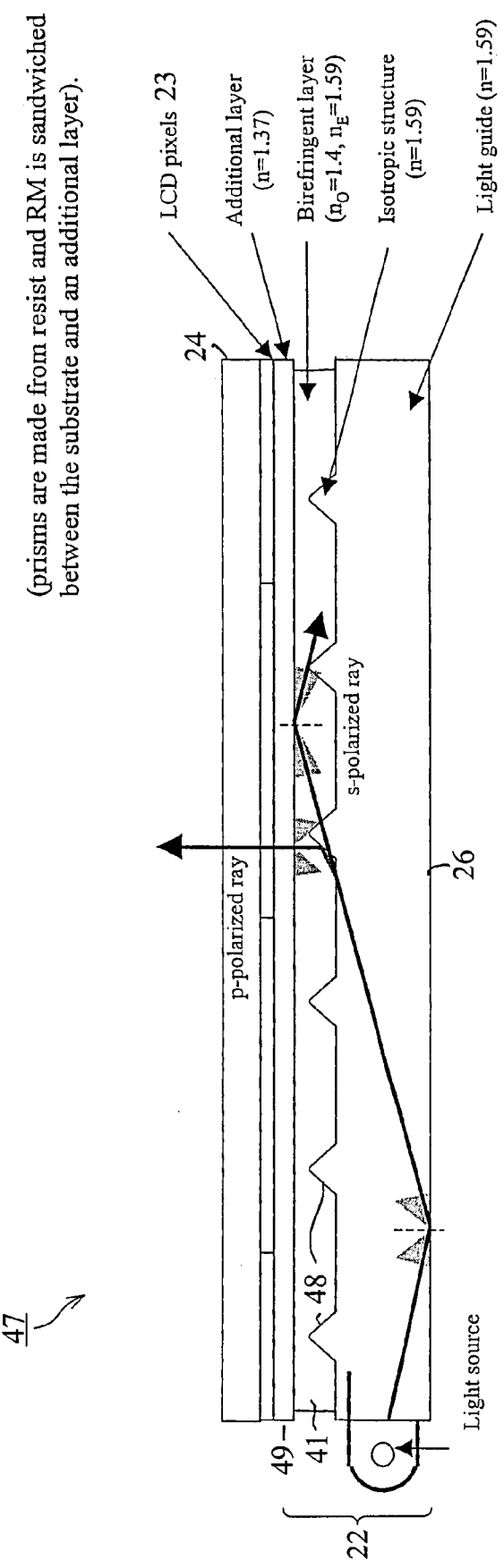
FIG. 15 is a schematic sectional plan view of a modified embodiment of the display of FIG. 9.

FIG. 15 is a schematic sectional view of a display 47 according to a further embodiment of the present invention. The display corresponds generally to the display 40 of FIG. 9, and components that are common to both displays will not be described again here.

In this embodiment the waveguide 26 of the backlight 22 acts also as the rear substrate of the SLM. Isotropic structures 48 are provided on the waveguide 26, and these are preferably integral with the waveguide 26. A layer 41 of birefringent material is provided over the waveguide 26, to sufficient depth to completely cover the protrusions 48.

In operation, light of a first polarisation state—in this example the p-polarisation state—does not undergo total internal reflection at the boundary between the waveguide 26 and the birefringent material 41, since the refractive index of the birefringent material for this polarisation is equal to, or greater than, the refractive index of the waveguide 26 for this polarisation. This polarisation component is extracted from the waveguide, and is then directed by the protrusions 48 into a desired direction (eg, when applied to a conventional 2-D display), or into first and second desired angular ranges (eg, when applied to a dual-view display).

A layer 49 having a refractive index lower than the lowest refractive index of the birefringent layer 41 is disposed over the birefringent layer. Light of the second polarisation component (in this example the s-polarisation component) does not see any index change between the waveguide 26 and the birefringent layer 41, but undergoes total internal reflection at the boundary between the birefringent layer and the layer 49, so that no light of the s-polarisation component is extracted from the waveguide.

The backlight of FIG. 15 is, as in the case of FIG. 9, again a polarised backlight that emits light of one polarisation state. The lower polariser 33 and the lower substrate 25 of the image display device may therefore be omitted, with the waveguide serving as the lower substrate of the image display device.

FIG. 15 shows light being emitted along the normal axis and at least one light extraction point for each pixel column (the pitch of the protrusions 49 shown in FIG. 15 is half the pixel pitch, giving two light extraction points for each pixel column) and this is appropriate for a conventional 2-D display. If the embodiment of FIG. 15 is applied to a dual-view display, however, it would necessary to change the width of the protrusions 49 to correspond generally with those shown in FIG. 3, so as to provide one light extraction point for each pair of left and right pixel columns. It would also be necessary to shape the light-directing surfaces of the protrusions 49 so as to direct light into two angular ranges corresponding to the desired viewing windows.

In general, where a backlight of the invention is used in a conventional 2-D display, it is possible to provide two or more light extraction points aligned with each pixel aperture of the image display layer. This provides uniform illumination over the area of the pixel. A further advantage of the invention is that, since the light extraction points are on the front face of the waveguide 26, it is possible to obtain good registration between the light extraction points and the pixels.

The backlight 22 of FIG. 15 may be arranged such that substantially all light extracted from the waveguide is emitted along or close to the normal axis. The backlight can thus provide a "private display mode", in which an image displayed on the image display layer 23 is transmitted only in a narrow range of directions. This is of use when, for example, a person wishes to use a laptop computer in a public area, as they can be sure that other people will not see an image displayed on the screen.

A further advantage of the backlight 22 of FIG. 15, when used to provide a narrow display mode, is that any light emitted at angles well away from the normal direction, for example as a consequence of imperfections in the surface of the waveguide would be s-polarised. This exit polariser (not shown) of the image display device would however be configured to operate with p-polarised light—and so any leakage of s-polarised light at high viewing angles would not produce a displayed image.

The display of FIG. 15 may be adapted by providing a second backlight (not shown), that emits light over a wide angular range, behind the waveguide 26. This allows the display to be switched between a public display mode and a private display mode. Switching the second backlight ON, while switching the light source(s) 27 of the backlight 22 OFF would provide a wide display mode, as a consequence of the second backlight emitting light over a wide angular range. Switching the second backlight OFF, while switching the light source(s) 27 of the backlight 220N, would provide a narrow display mode.

Figure 16:
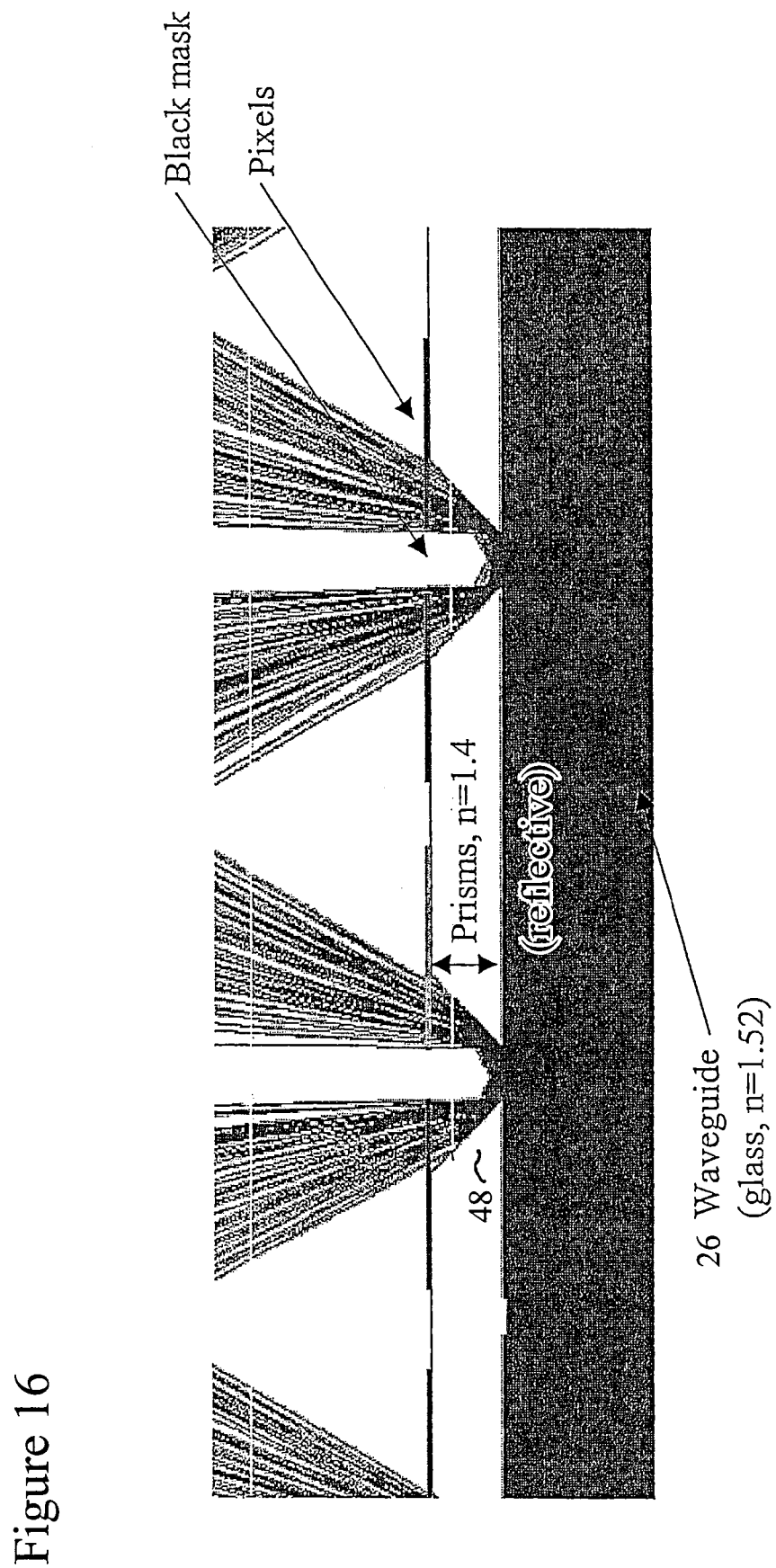
FIG. 16 illustrates operation of the display of FIG. 15.

FIG. 16 is a schematic sectional plan view illustrating operation of the display of FIG. 9 or FIG. 15. (It will be noted that FIGS. 9 and 15 show the isotropic structures 29 or the isotropic protrusions 48 spaced to provide one or more light extraction point for each pixel column as suitable for a conventional 2-D display, whereas FIG. 16 shows the isotropic protrusions 48 spaced to provide one light extraction point for each pair of left and right pixel with the light extracted from the waveguide directed by the prisms 49 into two angular ranges to provide a dual view display.) In this embodiment, the waveguide 26 of the display 40 again acts as the lower substrate of the SLM, so that the backlight is placed close to the liquid crystal layer. As explained, this is made possible because the backlight emits polarised light, so that the lower polariser 33 of FIG. 3 may be omitted.

The feature of varying the input aperture of the protrusions, or of the light extraction points, across the width of the waveguide, or varying the profile of the light-directing surfaces of the protrusions, to compensate for a decrease in intensity of light propagating within the waveguide 26 as described with reference to FIG. 3, may also be applied to the embodiments of FIGS. 8A, 9, 13, 14 and 15.

Figure 24A:
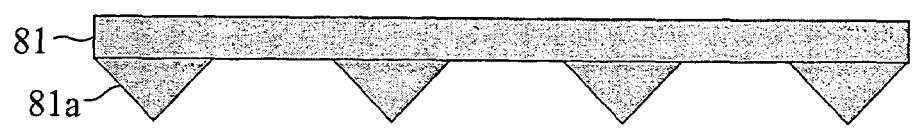
FIGS. 24A to 24D illustrate one method of manufacturing a backlight of the invention.
Figure 24B:
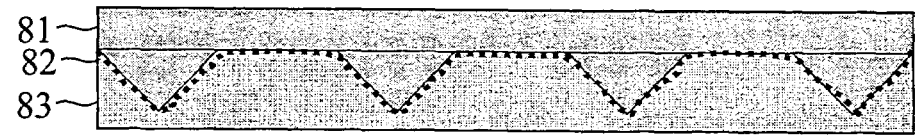

FIGS. 24A to 24D illustrate one method of manufacturing a backlight of the present invention. Initially in this method, a sheet 81 having transparent prisms 81a formed on one surface, shown in FIG. 24A, is coated with a metallic layer 82 or other reflective layer, for example using an evaporation process. A transparent material 83 having a refractive index lower than the refractive index of the waveguide is then disposed over the metallic layer 82 so as to planarise the sheet 81. The sheet 81 having transparent prisms formed on one surface is commercially available, and is typically a moulded plastics sheet. A transparent resin having a low refractive index, for example a refractive index of approximately 1.4 may be used as the low refractive index material 83.

Figure 24C:
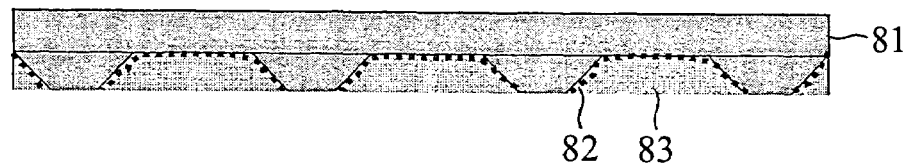
Figure 24D:
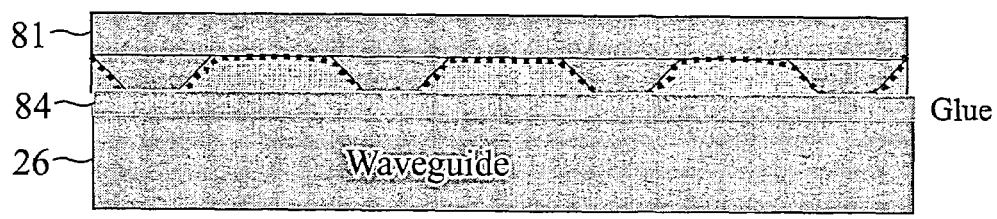

Next, the low refractive index material 83 and metallic layer are partially removed so as to expose the prisms 81a, and the prisms 81a are partially removed, as shown in FIG. 24C. This may be done using, for example, a polishing process.

A waveguide 26 is then adhered to the sheet 81, for example by gluing. As can be seen from FIG. 24D, the result (once suitable light sources have been provided) is a backlight similar to the backlight 22 of FIG. 3.

The glue 84 used to adhere the waveguide 26 to the sheet 81 preferably has a refractive index that is approximately equal to the refractive index of the waveguide 26, so that the layer of glue 84 and the waveguide 26 effectively act as a single waveguide that is slightly thicker than the waveguide 26. (Typically, the layer 84 of glue will have a thickness of approximately 200 nm.)

The metallic layer 82 may be replaced by a light-absorbing layer, for example by a layer of a light-absorbing polymeric material. This reduces the efficiency of the waveguide by approximately 10%.

FIGS. 25A to 25D illustrate another method of manufacturing a backlight of the present invention. This is generally similar to the method of FIGS. 24A to 24D, except that the step of providing the low refractive index material 83 is omitted. Thus, in the finally-obtained backlight, air 85 acts as the low refractive index material.

Figure 25A:
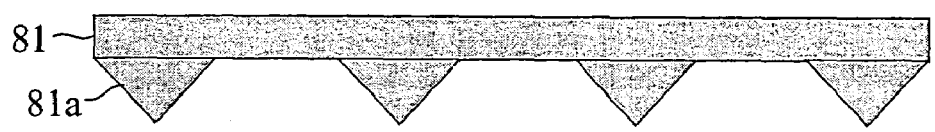
FIGS. 25A to 25D illustrate another method of manufacturing a backlight of the invention.
Figure 25B:
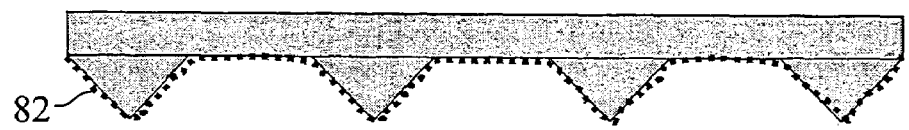
Figure 25C:
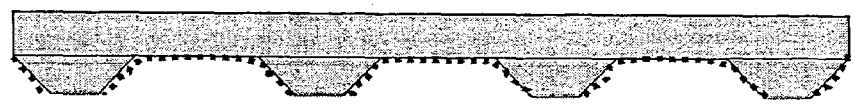
Figure 25D:
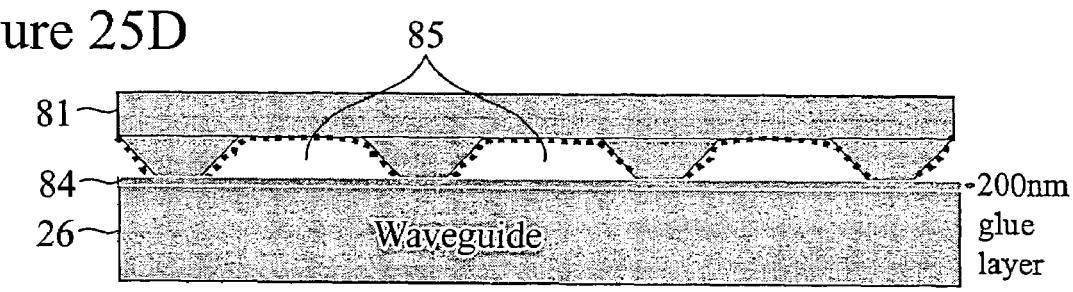

The metallic layer 82 of FIG. 25B may be replaced by a light-absorbing layer, for example by a layer of a light-absorbing polymeric material. This reduces the efficiency of the waveguide by approximately 10%.

Figure 26A:
FIGS. 26A to 26D illustrate another method of manufacturing a backlight of the invention.

FIGS. 26A to 26D illustrate another method of manufacturing a backlight of the present invention. In this method, a waveguide 26 is initially coated with a layer of a transparent material 83 having a refractive index lower than the refractive index of the waveguide 26, as shown in FIG. 26A. A transparent resin having a low refractive index, for example a refractive index of approximately 1.4 may be used as the material 83.

Next, the layer 83 of low refractive index material is profiled to form regions 83' having the desired shape of, for example, the regions 29 of low refractive index material in FIG. 3. The layer 83 of low refractive index material is completely removed between the desired regions 83' so as to expose the waveguide 26. The low refractive index material may be profiled using any suitable method such as, for example, laser ablation or lithography.

Figure 26B:
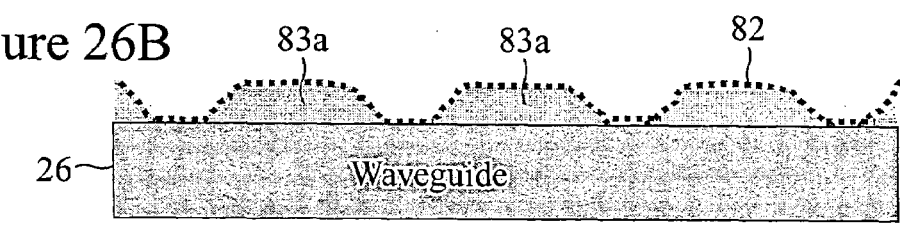

The waveguide is then coated with a metallic layer 82, or other reflective layer, for example using an evaporation process, as shown in FIG. 26B. The metallic layer is disposed over the regions 83' of low refractive index material and the exposed portions of the waveguide 26.

Figure 26C:
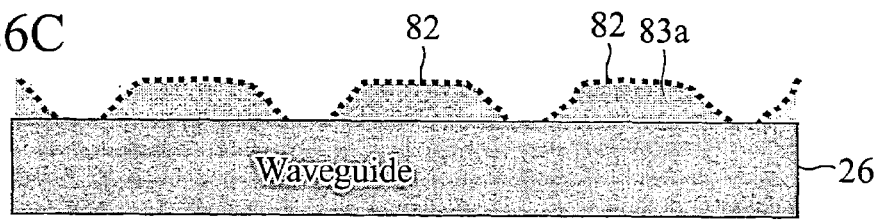

Next, the metallic layer 82 is removed where it covers the exposed portions of the waveguide 26, to leave the metallic layer covering only the regions 83' of low refractive index material as shown in FIG. 26C. This may be done using, for example, an etching process.

Figure 26D:
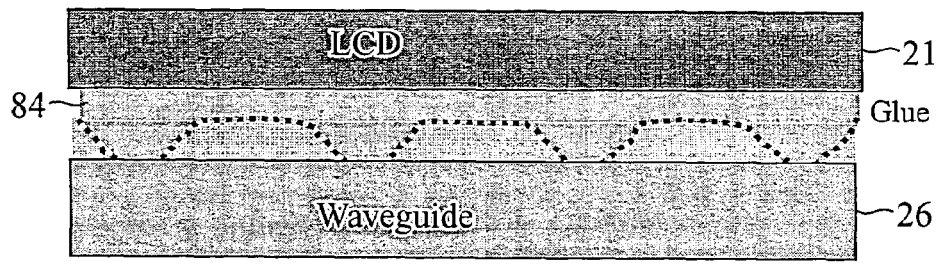

Finally, the waveguide is adhered to a display 21, such a liquid crystal display, for example using a transparent adhesive 84. If FIG. 26D is compared to FIG. 3, it will be seen that the adhesive layer 84 of FIG. 26D corresponds to the planarising layer 28 of FIG. 3.

The adhesive 84 may have a refractive index that is equal to, or is greater than, the refractive index of the waveguide 26 so that light propagating in the waveguide 26 will pass into the adhesive at the regions where the adhesive layer 84 makes contact with the waveguide. (In principle, some light would be extracted from the waveguide if the refractive index of the adhesive layer were slightly less than the refractive index of the waveguide 26, but the efficiency of the light-extraction process would be reduced.)

The metallic layer 82 of FIG. 26B may be replaced by a light-absorbing layer, for example by a layer of a light-absorbing polymeric material. This reduces the efficiency of the waveguide by approximately 10%.

Figure 26E:
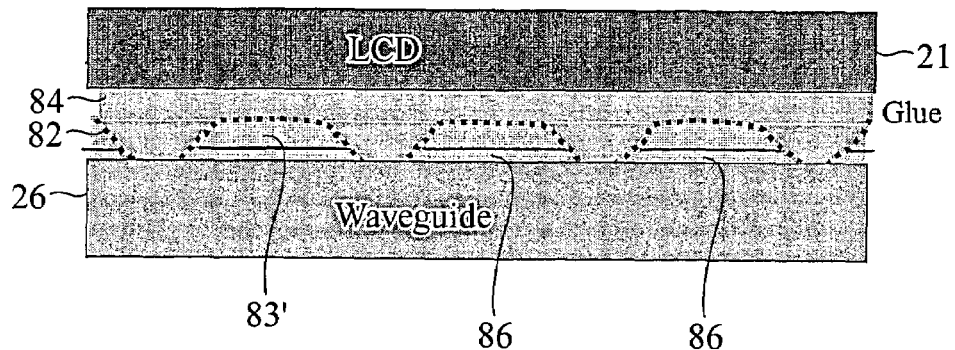
FIG. 26E illustrates another method of manufacturing a backlight of the invention.

FIG. 26E shows a modification of the method of FIGS. 26A to 26D. In this modified method, a layer 86 of $CaF_2$ is disposed over the waveguide 26 before the low refractive index material 83 is deposited. The $CaF_2$ is removed when the low refractive index material is profiled, and remains only underneath the regions 83' of low refractive index material that remain after the profiling step. $CaF_2$ has a refractive index of 1.25, so that leakage of light out of the waveguide into the regions 83' of low refractive index material that remain after the profiling step will be reduced.

In principle, $CaF_2$ could be used as the low refractive index material 83 in the method of FIGS. 26A to 26D. However, it is currently difficult to deposit $CaF_2$ with a thickness of more than 200-300 nm, whereas the regions 29 of low refractive index material in FIG. 3 typically have a thickness 5 µm or above.

Figure 27A:
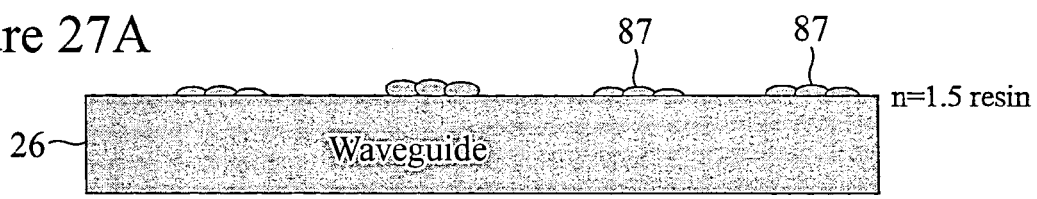
FIGS. 27A to 27D illustrate another method of manufacturing a backlight of the invention.

FIGS. 27A to 27D illustrate another method of manufacturing a backlight of the present invention. In this method, scattering structures 87 are created at desired locations on a surface of a waveguide 26 as shown in FIG. 27A. The scattering structures may be formed by, for example, depositing a material with a refractive index substantially equal to, or greater than, the refractive index of the waveguide 26. In one embodiment, a resin having a refractive index of n=1.5 may be used to form the scattering structures 87. A resist may also be used. The scattering structures extend into the plane of the paper, in a stripe-like manner.

Figure 27B:
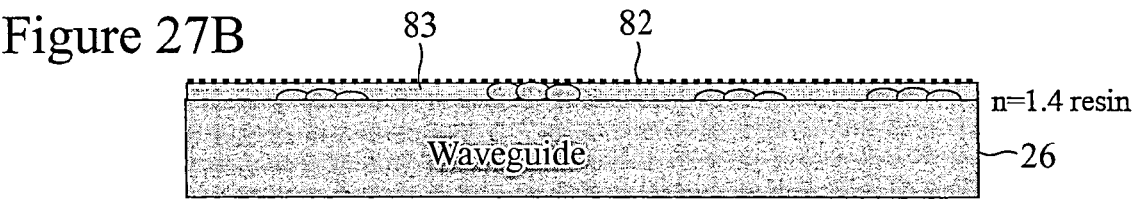

The waveguide 26 is then coated with a layer of a transparent material 83 having a refractive index lower than the refractive index of the waveguide 26, as shown in FIG. 27B. A transparent resin having a low refractive index, for example a refractive index of approximately 1.4, may be used as the material 83. The waveguide is then coated with a metallic layer 82 or other reflective layer, for example using an evaporation process. FIG. 27B shows the waveguide after the transparent low refractive index material 83 and the metallic layer 82 have been deposited.

Figure 27C:
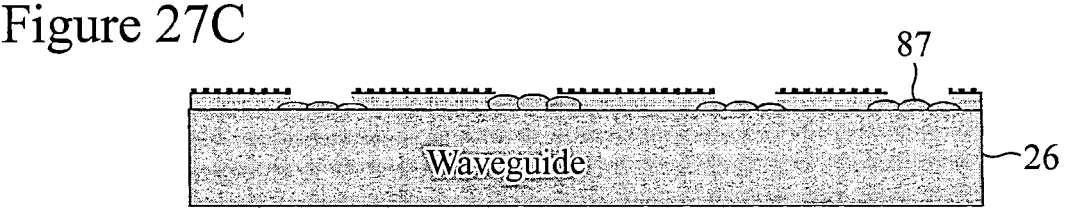

Next, the portions of the transparent low refractive index material 83 and the metallic layer 82 that overlie the scattering structures 87 are removed, as shown in FIG. 27C. This may be done using any suitable technique such as, for example:

lithography to etch through the metal layer 82 and the low refractive index material 83;

dry etching;

where the low refractive index material 83 is a resin, expose the resin from the opposite side of the waveguide, to cure the regions of resin that do not overlap the scattering structures, followed by etching using the cured regions of resin as resist;

laser ablation; or mechanical grinding techniques.

Figure 27D:
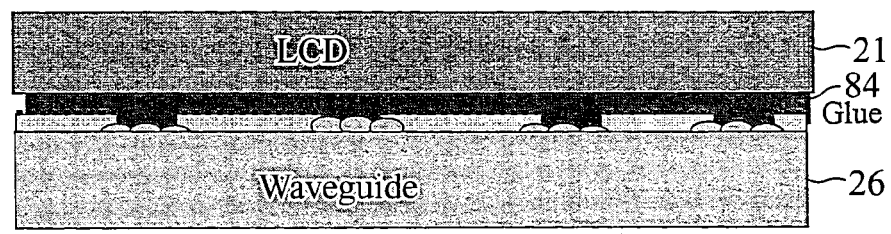

Finally, the waveguide is adhered to a display 21, such a liquid crystal display, for example using a transparent adhesive 84, as shown in FIG. 27D.

The adhesive 84 may have a refractive index that is equal to, or is greater than, the refractive index of the waveguide 26 so that light propagating in the waveguide 26 will pass into the adhesive at the regions where the adhesive layer 84 makes contact with the waveguide. (In principle, some light would be extracted from the waveguide if the refractive index of the adhesive layer were slightly less than the refractive index of the waveguide 26, but the efficiency of the light-extraction process would be reduced.)

The metallic layer 82 of FIG. 26B may be replaced by a light-absorbing layer, for example by a layer of a light-absorbing polymeric material. This reduces the efficiency of the waveguide by approximately 10%.

In the method of FIGS. 27A to 27D, the layer 83 of low refractive index material may be made thin. It is therefore possible to deposit a layer of $CaF_2$ as the layer 83 of low refractive index material. $CaF_2$ has a refractive index of 1.25, so that leakage of light out of the waveguide into the regions 83' of low refractive index material that remain after the profiling step will be reduced—this increases the efficiency of the backlight by up to 50%.

Figure 28A:
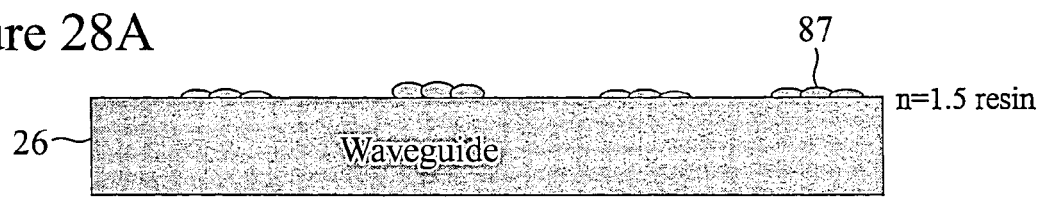
FIGS. 28A to 28D illustrate another method of manufacturing a backlight of the invention.
Figure 28B:
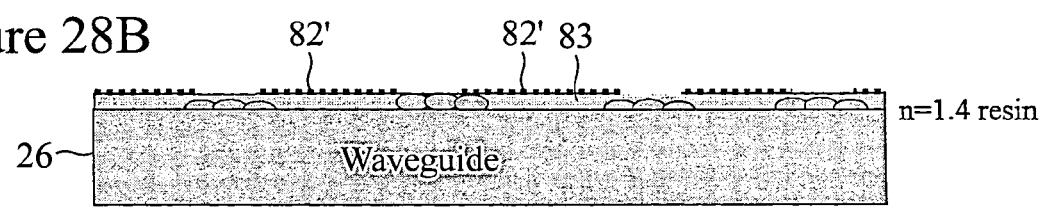
Figure 28C:
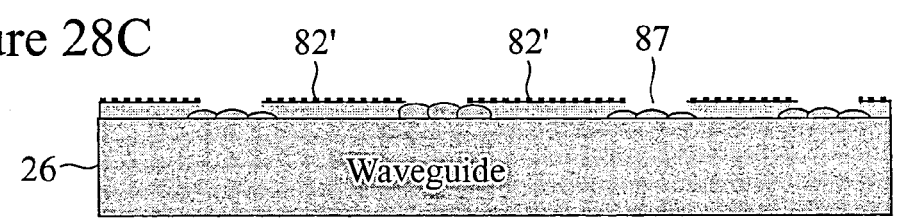
Figure 28D:
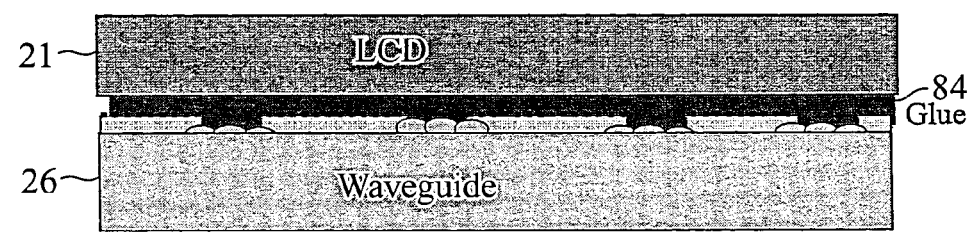

FIGS. 28A to 28D show a modification of the method of FIGS. 27A to 27D. In this method, the metal 82 is applied through a shadow mask as a plurality of metallic regions 82' so that, as shown in FIG. 28B, little or no metal is deposited over the scattering structures 87. The low refractive index material that overlies the scattering structures may then be removed using an etching process in which the metallic regions 82' act as a mask.

Figure 19B:
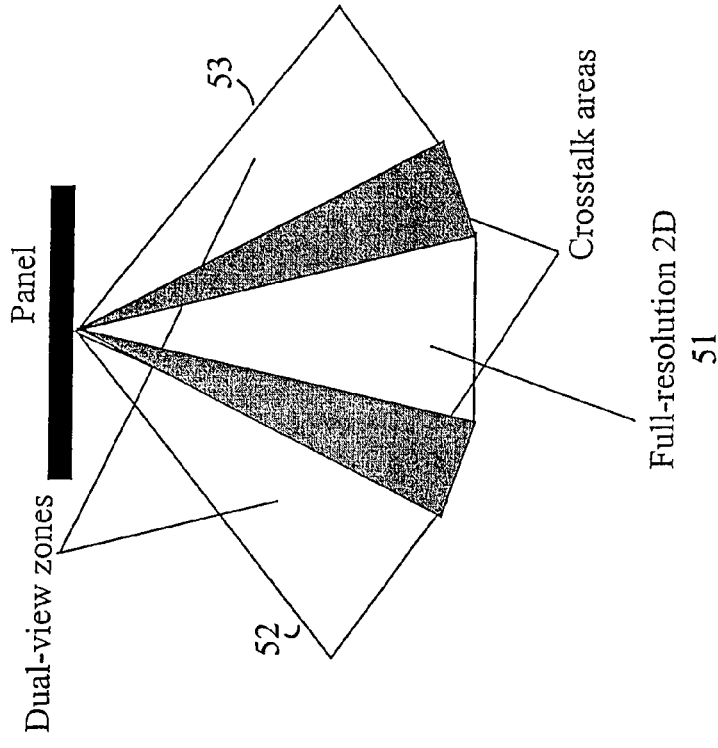
FIG. 19B is a plan view of the display of FIG. 19A in use.
Figure 19A:
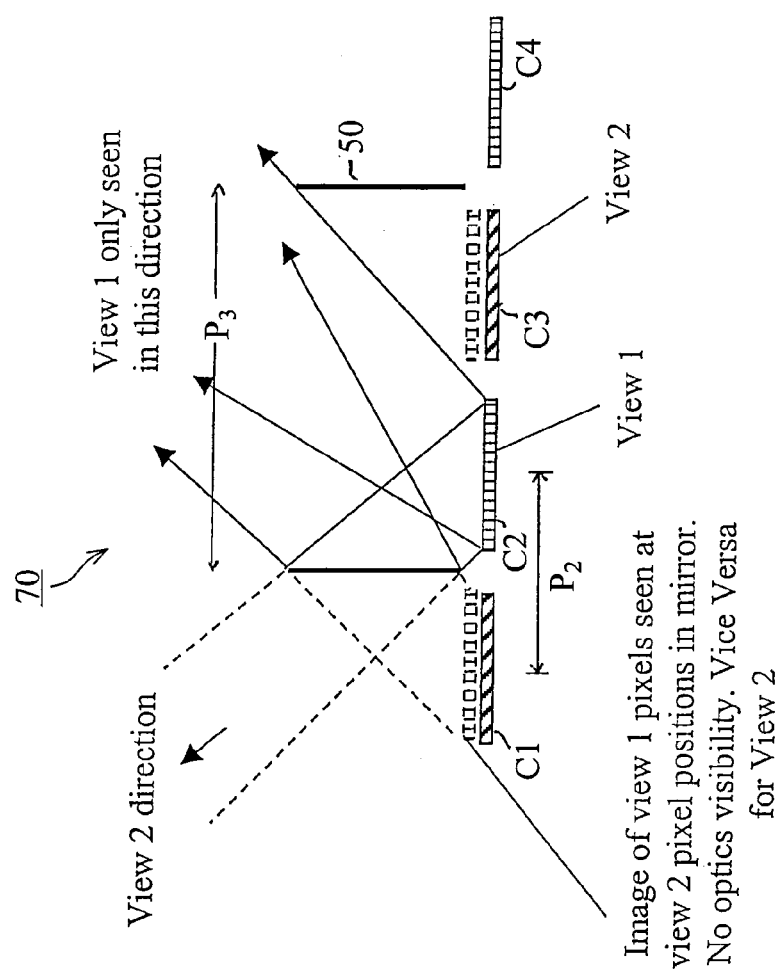
FIG. 19A is a schematic plan sectional view of a display according to a further embodiment of the present invention.

FIGS. 19A and 19B show a further display 70 of the invention. FIG. 19A is a schematic sectional plan view of the display, and FIG. 19B is a view of the display from above. The basic concept of the display 70 is the use of vertical (or near-vertical) louvres 50 that have reflective faces. The lower end of the louvres is positioned close to the plane of pixels of a pixellated SLM. The louvres 50 are aligned so that the pitch $p_3$ of the louvres is twice (or any multiple of twice) the pixel pitch $p_2$, i.e., $p_3=2np_2$, where n is an integer.

It is preferable that the louvres extend as close to the plane of the pixels as possible. In a practical display there will be a substrate overlaying the pixels, and it will be difficult in practice for the louvres to extend to the plane of the pixels. However, the louvres preferably extend as close as possible to the pixel plane, for example by abutting the lower ends of the louvres against the front face of the display. Preferably, a light-absorbing material is placed in all or part of the gap between the lower end of each louvre and the pixel plane.

This display has the feature that an observer viewing the display at a particular viewing angle (which is dependent on the height of the louvres 50 and on the pixel pitch), will see every alternate column of pixels but will not see the other columns of pixels, as these are blocked by the louvres. If two different images are displayed interlaced in the pixel columns, then two separate images can be seen at the two opposing viewing positions.

Making the louvres mirrored, however, means that a reflection of a viewed pixel column is also seen and would be seen from the location of a 'missing' pixel column. As an example, consider a first image displayed on pixel columns C2 and C4, and a second image displayed on pixel columns C1 and C3. An observer viewing the display 70 along the "view 1 direction" will see pixel columns C2 and C4, and will also see a reflection of pixel column C2. The reflection of pixel column C2 will appear to have come from the position of pixel column C1. The observer will also see a reflection of pixel column C4, apparently from the position of pixel column C3, and so on. Conversely, an observer viewing the display 70 from the same viewing angle, but on the other side of the normal axis of the display (ie, from the "view 2 direction"), will see pixel columns C1 and C3, and will also see a reflection of pixel column C1 apparently from the position of pixel column C2. Since the images of the pixel column reflected in the louvre appear in the position of a 'missing' pixel column, an apparently full resolution view is obtained.

When the display is viewed from the normal direction, or from a direction close to the normal direction, the louvres 50 will not obscure any pixel columns, and a normal 2D image would be seen. Thus, the display provides a central viewing region 51 in which a conventional 2-D image is visible, and also provides viewing windows 52,53 at higher viewing angles which provide a multiple view directional display mode.

Thus the main advantages of the display 70 are that:

The brightness in each viewing window is the same as the brightness of the base SLM panel. The significant loss of brightness in a conventional parallax barrier display is eliminated.

There is no limiting viewing angle or distance, or loss of image quality, as compared to the design limitations of lenticular based dual view displays.

No optical features emerge from the display surface, so the display is cosmetically similar to a conventional display.

No optical structures are visible in the viewing window, in comparison to parallax barrier displays where the parallax barrier may be visible to a viewer.

A user is not required to wear any eyewear.

The central wide 2D viewing window 51 makes the display usable as an ordinary full resolution display when viewed centrally. This is not the case with any other fixed dual view display.

This aspect of the invention is applicable to fixed dual view displays where brightness or barrier visibility is an issue, such as in-car systems and also in desktop gaming machines where a 2-D view can be seen from central viewing positions with dual-view side viewing windows for multi-player gaming.

Figure 20:
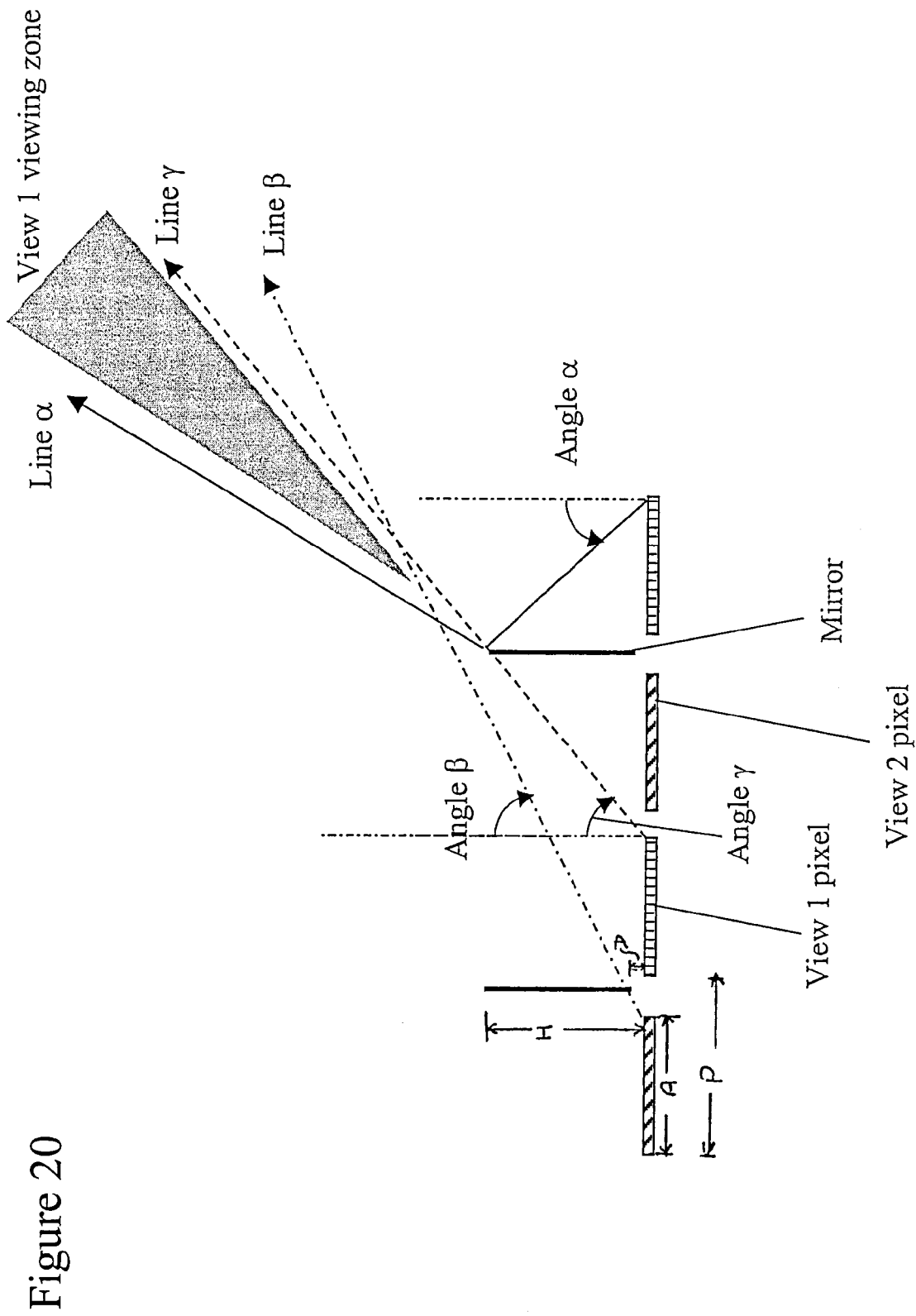
FIG. 20 illustrates operation of the display of FIG. 19A.

The viewing angle and viewing freedom is related to the pixel pitch, pixel aperture width, height of the louvres and the distance between the base of the louvres and the pixel plane. The geometry for this arrangement is shown in FIG. 20.

The pixel pitch in this diagram is P, the pixel aperture width is A, the height of the louvre above the plane of the pixels is H and the open area between the base of the louvre and the pixel plane is D. The angles $\alpha$, $\beta$ and $\gamma$ (all are measured from the normal direction) are given by:

$$\tan\alpha = \frac{P+A}{2H} \quad \tan\beta = \frac{P-A}{2D} \quad \tan\gamma = \frac{3P-A}{2H} \qquad (1)$$

The centre half-viewing angle, $\theta$, is given as the average of angles $\alpha$ and $\gamma$, and the viewing freedom, Z, is given by the difference between the same angles. Thus the formulae for the full viewing angle (2$\theta$) and viewing freedom (Z) are:

$$\tan(2\theta) = \frac{8HP}{4H^2 - (3P-A)(P+A)} \quad \tan Z = \frac{4H(P-A)}{4H^2 + (3P-A)(P+A)} \qquad (2)$$

There is a further condition that $\beta > \gamma$ so that no loss of viewing freedom is cause by light passing through the glass under the louvre 50. The effect of refractive index can be found by applying Snell's law to the angles $\alpha$, $\beta$ and $\gamma$ before making the viewing freedom calculations. If there is glass of refractive index N between the louvres, the viewing angle and freedom are given by (as long as the total internal reflection condition is not satisfied):

$$\sin(2\theta) = \frac{N(P+A)\sqrt{4H^2 - (N^2-1)(3P-A)^2} + N(3P-A)\sqrt{4H^2 - (N^2-1)(P+A)^2}}{\sqrt{(4H^2 + (3P-A)^2)(4H^2 + (P+A)^2)}}$$

$$\sin(Z) = \frac{N(P+A)\sqrt{4H^2 - (N^2-1)(3P-A)^2} - N(3P-A)\sqrt{4H^2 - (N^2-1)(P+A)^2}}{\sqrt{(4H^2 + (3P-A)^2)(4H^2 + (P+A)^2)}}$$

Quite large viewing angles (for example a viewing angle of 45° or greater) are easily obtainable with mirror louvre heights roughly equal to the pixel pitch or less.

To improve viewing freedom at the expense of the central 2-D viewing zone 51 and optics visibility, the louvres may not may not have a uniform thickness over their entire height, but the thickness of the louvres may increase over the height of the louvre. As an example, a louvre 54 having reflective surfaces 54a,54b that are inclined with respect to the normal direction, so that the louvre 54 is "wedge-shaped" in cross-section, may be used, as shown in FIG. 21A.

Alternatively, it is possible to put a small "T" cap 56 across the top of a louvre 55 thus giving them a "T-shape" cross section as shown in FIG. 21B. The cap 56 extends substantially perpendicular to the upstanding section of the louvre.

Figure 22B:
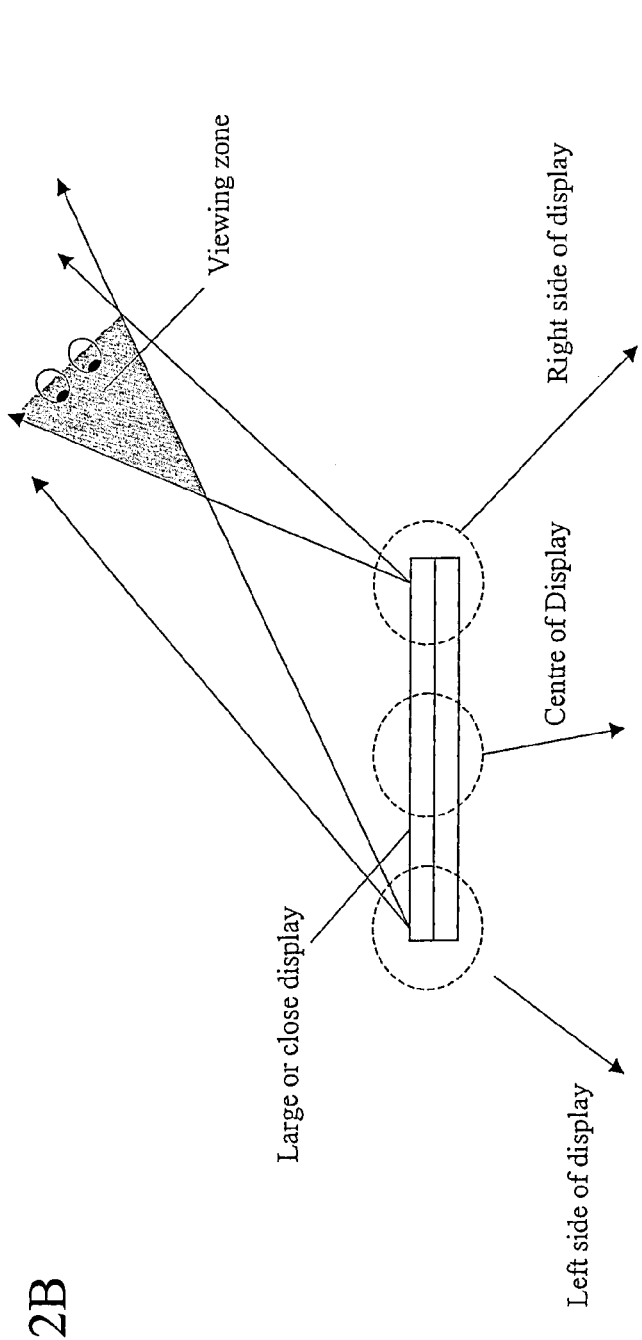
FIG. 22B is a plan view showing operation of the display of FIG. 22A.
Figure 22A:
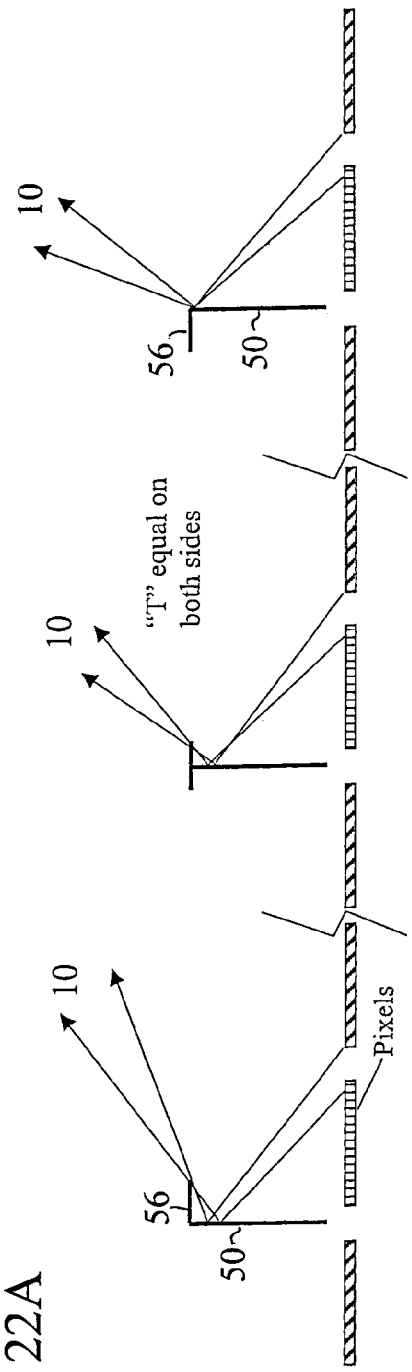
FIG. 22A is a schematic sectional plan view of a further modified embodiment of the display of FIG. 19A.
Figure 23A:
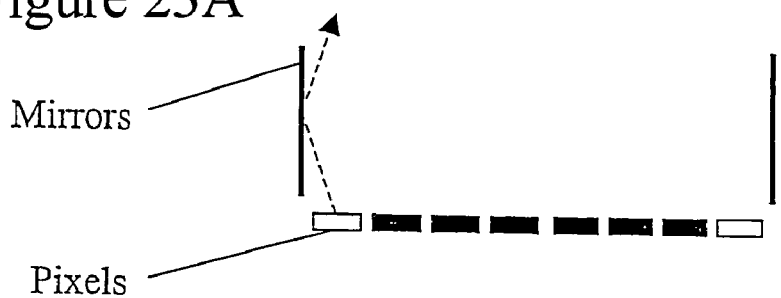
FIGS. 23A to 23D illustrate operation of the display of FIG. 19A.
Figure 23B:
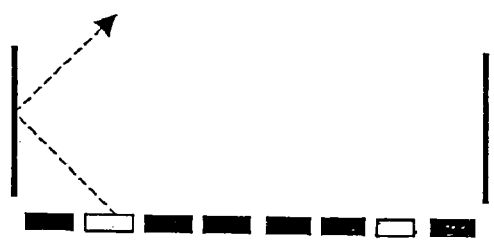
Figure 23C:
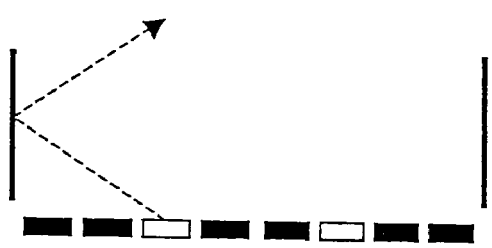
Figure 23D:
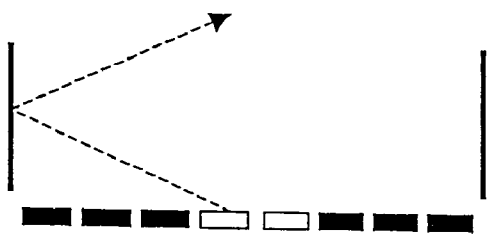

A variation in the cross-section of the louvres 50 across a large display intended for close-in viewing can offset viewpoint error caused by viewing the display at slightly different angles at different places across the display. For example, the wedge angle (for a louvre 54 as in FIG. 21A) or the width of the "T" cap 56 on the top of the louvre (for a louvre 55 as in FIG. 21B) can be varied across the display 49. FIGS. 22A and 22B show such a display, for the example of louvres 55 with a "T-shape" cross-section. As viewed from the left of the display axis, by a left observer 10, the length by which the top cap 56 of the "T" protrudes to the left of the upstanding part of the louvre 55 varies from small at the left of the display to large at the right of the display. This varies the view angle and viewing freedom to maintain the correct viewing zone for the eye. Conversely, as viewed from the right of the display axis, by a right observer, the length by which the top cap 56 of the "T" protrudes to the right of the upstanding part of the louvre 55 varies from small at the right of the display to large at the left of the display, with the top part of the "T" protruding equally to both sides of the upstanding part of the louvre 55 equal only in the centre of the display.

A similar effect can be obtained in the embodiments of FIGS. 3 to 15 by varying the shape of the protrusions across the display. In the case of protrusions having a light-directing surface with a linear cross-section, as shown in FIG. 7A or 7B, the angle of inclination of the protrusions may be varied across the width of the display to achieve the effect shown in FIGS. 22A and 22B.

If the louvre pitch is greater than twice the pixel pitch spacing, then a variable view angle system could be made by applying image data to specific columns relating to the view angle selected. The concept is shown in FIGS. 23A to 23D. Selection of the column of pixels nearest to a louvre, as in FIG. 23A, produces the lowest viewing angle, whereas selection of the column of pixels furthest from a louvre produces the highest viewing angle as in FIG. 23D. Selection of an intermediate column of pixels produces an intermediate viewing angle, as in FIGS. 23B and 23C. It is also clear that the viewing angles on each side can be individually selected by choice of the appropriate pixel column.

Figure 29A:
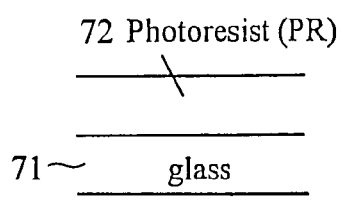
FIGS. 29A to 29D illustrate another method of manufacturing a backlight of the invention.

FIGS. 29A to 29D illustrate one method of manufacturing a display 70 as shown in FIG. 19A. Initially, as shown in FIG. 29A, a layer of a transparent photoresist 72 is disposed over a transparent substrate 71. The transparent substrate 71 may be, for example, a glass substrate.

Figure 29B:
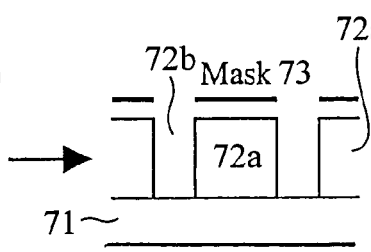

The photoresist 72 is then selectively exposed, for example using a mask 73 as shown in FIG. 29B. This leaves "towers" 72a of photoresist, with adjacent photoresist towers 72a being separated by regions 72b where the photoresist was removed upon exposure. The towers of photoresist extend perpendicular to the plane of the paper in FIG. 29B.

Figure 29C:
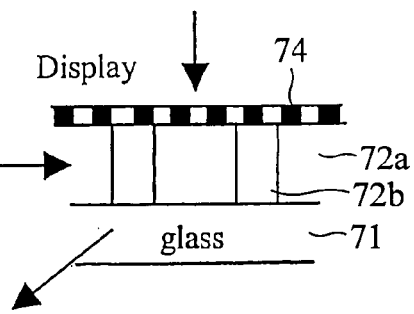

A display 74 is then placed over the photoresist towers 72a, as shown in FIG. 29C.

Figure 29D:
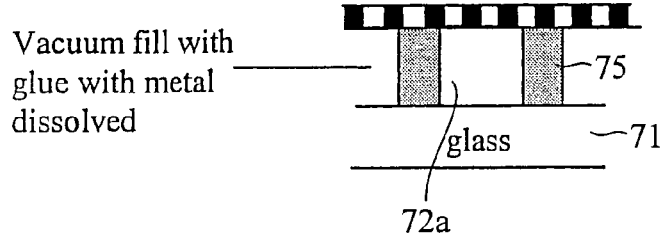

Finally, the regions 72b where the photoresist was removed upon exposure are filled with a light-reflective material 75, as shown in FIG. 29D. The light-reflective material may, for example, be a glue containing dissolved metal particles to make it light-reflective. The light-reflective material 75 may be introduced into the regions 72b where the photoresist was removed upon exposure by any suitable method such as, for example, vacuum filling. The regions of light reflective material extend generally perpendicular to the plane of the display, and form the louvres 50 with reflective faces of FIG. 19A.

Figure 30A:
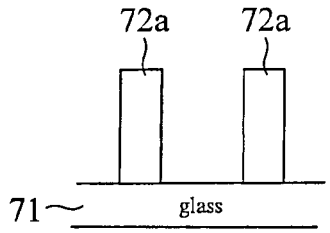
FIGS. 30A and 30B illustrate another method of manufacturing a backlight of the invention.
Figure 30B:
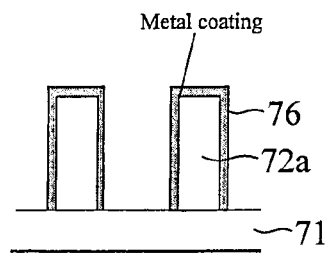

FIGS. 30A and 30B illustrate another method of manufacturing a display 70 as shown in FIG. 19A. Initially, as described with reference to FIG. 29A and FIG. 29B, a layer of a transparent photoresist is disposed over a transparent substrate 71. The transparent substrate 71 may be, for example, a glass substrate. The photoresist 72 is then selectively exposed to leave "towers" 72a of photoresist, with adjacent photoresist towers 72a being separated by regions 72b where the photoresist was removed upon exposure. The towers 72a extend generally perpendicular to the plane of the paper in FIG. 30A.

The towers 72a of photoresist are then coated with a light-reflective coating 76. For example, a metallic coating may be deposited over the towers 72a of photoresist by an evaporation process.

A display is then placed over the coated photoresist towers 72a, in the manner shown in FIG. 29C. The light-reflective surfaces of the coated photoresist towers 72a extend generally perpendicular to the plane of the display, and form the louvres 50 with reflective faces of FIG. 19A.

In these methods, the selective exposure of the photoresist layer is carried out to obtain photoresist towers of the appropriate dimensions. (It will be noted that in the method of FIGS. 30A and 30B the photoresist towers 72a form the louvres 50 of FIG. 19A, whereas in the method of FIGS. 29A to 29D the spaces 72b between the photoresist towers 72a form the louvres 50 of FIG. 19A.)

Figure 31A:
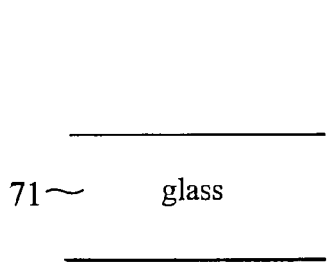
FIGS. 31A and 31B illustrate another method of manufacturing a backlight of the invention.
Figure 31B:
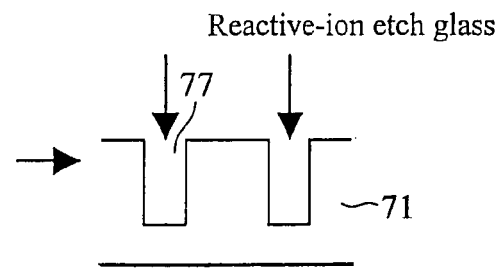

FIGS. 31A and 31B illustrate another method of manufacturing a display 70 as shown in FIG. 19A. In this method, trenches 77 are formed in a transparent substrate 71 such as a glass substrate. The trenches extend generally perpendicular to the plane of the paper in FIG. 31B. The trenches may be formed by any suitable process such as, for example, an etching process such as reactive ion etching.

A display is then placed over the substrate 71, in the manner shown in FIG. 29C.

Finally, the trenches 77 in the substrate 71 are filled with a light-reflective material. The light-reflective material may, for example, be a glue containing dissolved metal particles to make it light-reflective. The light-reflective material may be introduced into trenches 77 in the substrate 71 by any suitable method such as, for example, vacuum filling. The regions of light reflective material extend generally perpendicular to the plane of the display, as shown in FIG. 29D, and form the louvres 50 with reflective faces of FIG. 19A.

Figure 32A:
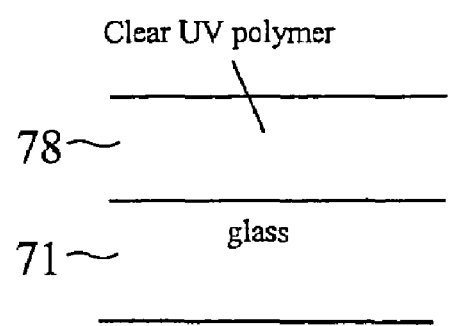
FIGS. 32A and 32B illustrate another method of manufacturing a backlight of the invention.
Figure 32B:
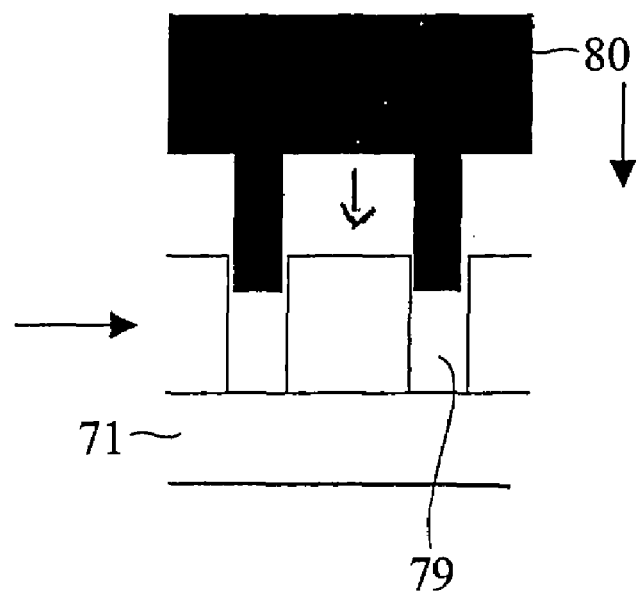

FIGS. 32A and 32B illustrate another method of manufacturing a display 70 as shown in FIG. 19A. Initially, a layer 78 of a transparent, curable material is disposed over a transparent substrate 71 (by "transparent" is meant that the material is transparent after it has been cured). The transparent substrate 71 may be, for example, a glass substrate.

The layer 78 of a transparent, curable material is then embossed using a suitable embossing tool 80, as shown in FIG. 32B such that recesses 79 are formed in the layer 78. The recesses 79 extend generally perpendicular to the plane of the paper, and preferably extend through the complete thickness, or through substantially the complete thickness, of the layer 78.

The layer 78 is then cured. For example, the layer 78 may be a layer of an UV-curable material, in which case the layer is irradiated with UV radiation after the embossing step.

A display is then placed over the layer 78, in the manner shown in FIG. 29C.

Finally, the recesses 79 in the layer 78 are filled with a light-reflective material. The light-reflective material may, for example, be a glue containing dissolved metal particles to make it light-reflective. The light-reflective material may be introduced into recesses 79 in the layer 78 by any suitable method such as, for example, vacuum filling. The regions of light reflective material extend generally perpendicular to the plane of the display, in the manner shown in FIG. 29D, and form the louvres 50 with reflective faces of FIG. 19A.

The methods of FIGS. 29A to 32B may readily be adapted to manufacture displays having the wedge-shaped louvres 54 of FIG. 21A, or the "T-cap" louvres 55 of FIG. 21B. For example, wedge-shaped recesses or T-shaped recesses may be formed in the method of FIGS. 32A and 32B by use of a suitable embossing tool, or may be formed in the method of FIGS. 31A and 31B by use of suitable etching techniques.

What is claimed is:

1. A display comprising:
a transmissive pixellated spatial light modulator; and
a backlight;
wherein the backlight has a light-transmissive waveguide, a first face of the waveguide being opposed to the spatial light modulator;
wherein the first face of the waveguide comprises a plurality of regions that are not totally internally reflective for at least one polarisation of light propagating within the waveguide, the remainder of the first face of the waveguide being totally internally reflective for light propagating within the waveguide;

wherein the pitch of the regions is substantially an integer multiple of the pitch of the pixels of the spatial light modulator along a given direction; and wherein the regions are configured such that substantially no light emitted from the backlight is incident on a spacing between adjacent pixels along the given direction.

2. A display as claimed in claim 1 wherein a plurality of protrusions are disposed on the first face of the waveguide of the backlight, each protrusion having a refractive index that is not lower than the refractive index of the waveguide whereby the protrusion is not totally internally reflective for light propagating within the waveguide.

3. A display as claimed in claim 2 wherein regions of the first face between neighbouring protrusions are coated with a material having a refractive index that is lower than the refractive index of the waveguide.

4. A display as claimed in claim 3 wherein the first angular range is on an opposite side of the normal axis of the display to the second angular range.

5. A display as claimed in claim 2 wherein the protrusions have light-directing surfaces shaped so as to direct light transmitted out of the waveguide into first and second angular ranges, the first angular range not overlapping the second angular range.

6. A display as claimed in claim 5 wherein a cross-section through the light-directing surface of the protrusion has at least a portion that is linear.

7. A display as claimed in claim 6 wherein the light-directing surface of the protrusion has at least a portion that is planar.

8. A display as claimed in claim 6 wherein the light-directing surface of the protrusion has at least a portion that is at an angle of between 35° to 55° to the first face of the waveguide.

9. A display as claimed in claim 5 wherein a cross-section through the light-directing surface of the protrusion has at least a portion that is concave.

10. A display as claimed in claim 5 wherein the shape of the light-directing surfaces of the protrusion is dependent upon the distance of the protrusion from a side edge of the waveguide.

11. A display as claimed in claim 2 wherein each protrusion extends substantially over the entire height of the backlight.

12. A display as claimed in claim 2 wherein each protrusion has the form of a solid of revolution about an axis perpendicular to the front face of the waveguide.

13. A display as claimed in claim 12 wherein each protrusion is conical or frusto-conical.

14. A display as claimed in claim 2 wherein the refractive index of the protrusions is equal to the refractive index of the waveguide of the backlight.

15. A display as claimed in claim 2 wherein the refractive index of the protrusions is greater than the refractive index of the waveguide of the backlight.

16. A display as claimed in claim 2 wherein an input aperture of a protrusion is dependent upon the distance of the protrusion from a side edge of the waveguide.

17. A display as claimed in claim 2 wherein a photo-luminescent material and a wavelength-dependent filter are disposed between selected ones of the protrusions and the first face of the waveguide, the filter being between the photo-luminescent material and the first face of the waveguide, the photoluminescent material emitting visible light when illuminated by light of a predetermined wavelength outside the visible spectrum, and the wavelength-dependent filter being transmissive for light of the predetermined wavelength and non-transmissive for visible light.

18. A display as claimed in claim 17 wherein the photo-luminescent material and wavelength-dependent filter are disposed between every alternate protrusion and the first face of the waveguide.

19. A display as claimed in claim 17 wherein the wavelength-dependent filter is reflective for visible light.

20. A display as claimed in claim 17 wherein light of the predetermined wavelength is ultra-violet light.

21. A display as claimed in claim 17 wherein the backlight comprises a first light source for emitting light in the visible range of the spectrum and a second light source, controllable independently from the first light source, for emitting light of the predetermined wavelength.

22. A display as claimed in claim 1 wherein the regions of the first face of the waveguide of the backlight that are not totally internally reflective are provided with a scattering structure for scattering light out of the waveguide.

23. A display as claimed in claim 22 wherein the regions of the first face of the waveguide that are totally internally reflective are overlaid with a material having a refractive index lower than the refractive index of the waveguide.

24. A display as claimed in claim 22 wherein the regions of the first face of the waveguide that are totally internally reflective are overlaid with a material that is not transmissive to visible light.

25. A display as claimed in claim 24 wherein the regions of the first face of the waveguide that are totally internally reflective are overlaid with a material that is reflective to visible light.

26. A display as claimed in claim 25 wherein the photo-luminescent material and wavelength-dependent filter are disposed over every alternate region of the first face of the waveguide of the backlight that is not totally internally reflective.

27. A display as claimed in claim 22 wherein a photo-luminescent material and a wavelength-dependent filter are disposed over selected ones of the regions of the first face of the waveguide of the backlight that are not totally internally reflective, the filter being between the photo-luminescent material and the first face of the waveguide, the photoluminescent material emitting visible light when illuminated by light of a predetermined wavelength outside the visible spectrum, and the wavelength-dependent filter being transmissive for light of the predetermined wavelength and non-transmissive for visible light.

28. A display as claimed in claim 27 wherein the wavelength-dependent filter is reflective for visible light.

29. A display as claimed in claim 27 wherein the predetermined wavelength is within the ultra-violet region of the spectrum.

30. A display as claimed in claim 27 wherein the backlight comprises a first light source for emitting light in the visible range of the spectrum and a second light source, controllable independently from the first light source, for emitting light of the predetermined wavelength.

31. A display as claimed in claim 1 and comprising a structure overlying the waveguide of the backlight, selected regions of the structure having birefringent properties whereby the interface between the waveguide and the selected regions of the structure is not totally internally reflective for at least one polarisation of light propagating within the waveguide.

32. A display as claimed in claim 31 wherein a plurality of birefringent protrusions are disposed on the first face of the waveguide of the backlight, each protrusion having a refractive index that, for light of a first polarisation, is not lower than the refractive index of the waveguide whereby the protrusion is not totally internally reflective for light of the first polarisation propagating within the waveguide.

33. A display as claimed in claim 32 wherein each protrusion has a refractive index, for light of a second polarisation different from the first polarisation, that is lower than the refractive index, for the second polarisation, of the waveguide whereby the protrusion is totally internally reflective for light of the second polarisation propagating within the waveguide.

34. A display as claimed in claim 32 wherein regions of the first face between neighbouring protrusions are coated with a material having a refractive index, for light of a first polarisation, that is lower than the refractive index, for light of a first polarisation, of the waveguide.

35. A display as claimed in claim 32 wherein the protrusions have light-directing surfaces shaped so as to direct light of the first polarisation transmitted out of the waveguide into first and second angular ranges, the first angular range not overlapping the second angular range.

36. A display as claimed in claim 35 wherein the first angular range is on an opposite side of the normal axis of the display to the second angular range.

37. A display as claimed in claim 35 wherein a cross-section through the light-directing surface of the protrusion has at least a portion that is linear.

38. A display as claimed in claim 37 wherein the light-directing surface of the protrusion has at least a portion that is planar.

39. A display as claimed in claim 37 wherein the light-directing surface of the protrusion has at least a portion that is at an angle of between 35° to 55° to the first face of the waveguide.

40. A display as claimed in claim 35 wherein a cross-section through the light-directing surface of the protrusion has at least a portion that is concave.

41. A display as claimed in claim 32 wherein each protrusion extends substantially over the entire height of the backlight.

42. A display as claimed in claim 32 wherein each protrusion has the form of a solid of revolution about an axis perpendicular to the front face of the waveguide.

43. A display as claimed in claim 42 wherein each protrusion is conical or frusto-conical.

44. A display as claimed in claim 32 wherein the refractive index of the protrusions, for light of the first polarisation, is equal to the refractive index of the waveguide of the backlight for light of the first polarisation.

45. A display as claimed in claim 32 wherein the refractive index of the protrusions, for light of the first polarisation, is greater than the refractive index of the waveguide of the backlight for light of the first polarisation.

46. A display as claimed in claim 32 wherein an input aperture of the protrusion is dependent upon the distance of the protrusion from a side edge of the waveguide.

47. A display as claimed in claim 32 wherein the light guide is birefringent.

48. A display as claimed in claim 32 and comprising: a light source disposed adjacent to one side edge of the waveguide of the backlight; and a reflective polarisation converter for converting light of the second polarisation to the first polarisation disposed adjacent to an opposite side edge of the waveguide.

49. A display as claimed in claim 1, wherein the regions of the first face of the waveguide of the backlight that are not totally internally reflective each comprise a plurality of microprisms.

50. A display as claimed in claim 49, wherein each of the plurality of mircoprisms are configured such that light incident at an angle of close to 0 degrees to a surface of the microprism is internally reflected.

51. A display as claimed in claim 50, wherein each of the plurality of microprisms are configured such that light incident at an angle close to 90 degrees to the surface of the microprism is not internally reflected.

52. A display as claimed in claim 49, wherein each of the plurality of microprisms are configured such that light is emitted from the region in angular ranges centered about a normal axis of the display.

53. A display as claimed in claim 49, wherein each of the plurality of microprisms is configured such that light emitted from the microprisms is within two predetermined angular ranges.

54. A display as claimed in claim 53, further comprising a layer of material extending over each of the plurality of microprisms, said layer of material having a refractive index that prevents light from being emitted outside the two predetermined angular ranges.

55. A display as claimed in claim 49, further comprising a layer of material extending over the regions, said layer of material having a refractive index equal to or greater than a refractive index of the waveguide.

* * * * *